(12) United States Patent
Ayrapetian et al.

(10) Patent No.: US 12,401,942 B1
(45) Date of Patent: Aug. 26, 2025

(54) GROUP BEAM SELECTION AND BEAM MERGING

(71) Applicant: Amazon Technologies, Inc., Seattle, WA (US)

(72) Inventors: Robert Ayrapetian, Morgan Hill, CA (US); Gautam Shreedhar Bhat, Sunnyvale, CA (US); Pradeep Kumar Govindaraju, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 293 days.

(21) Appl. No.: 18/323,697

(22) Filed: May 25, 2023

(51) Int. Cl.
| | |
|---|---|
| *H04R 3/00* | (2006.01) |
| *H04B 11/00* | (2006.01) |
| *H04R 1/32* | (2006.01) |

(52) U.S. Cl.
CPC .............. *H04R 1/32* (2013.01); *H04B 11/00* (2013.01)

(58) Field of Classification Search
CPC .................................. H04R 1/32; H04B 11/00
USPC .................................................... 381/92, 122
See application file for complete search history.

(56) References Cited

U.S. PATENT DOCUMENTS

| | | | |
|---|---|---|---|
| 5,808,967 A | 9/1998 | Yu et al. | |
| 6,049,607 A | 4/2000 | Marash et al. | |
| 6,836,243 B2 | 12/2004 | Kajala et al. | |
| 7,117,145 B1 | 10/2006 | Venkatesh et al. | |
| 7,174,022 B1 | 2/2007 | Zhang et al. | |
| 7,190,775 B2 | 3/2007 | Rambo | |
| 7,359,520 B2 | 4/2008 | Brennan et al. | |
| 8,139,787 B2 | 3/2012 | Haykin et al. | |
| 8,160,273 B2 | 4/2012 | Visser et al. | |
| 8,175,291 B2 | 5/2012 | Chan et al. | |
| 8,296,143 B2 | 10/2012 | Kudoh | |
| 8,321,214 B2 | 11/2012 | Chan et al. | |
| 8,538,749 B2 | 9/2013 | Visser et al. | |
| 8,620,672 B2 | 12/2013 | Visser et al. | |
| 8,744,849 B2 | 6/2014 | Liao | |
| 8,831,936 B2 | 9/2014 | Toman et al. | |
| 8,849,657 B2 | 9/2014 | Shin | |
| 8,861,756 B2 | 10/2014 | Zhu et al. | |
| 8,929,564 B2 | 1/2015 | Kikkeri | |
| 8,954,324 B2 | 2/2015 | Wang et al. | |
| 9,048,942 B2 | 6/2015 | Hershey et al. | |

(Continued)

OTHER PUBLICATIONS

U.S. Appl. No. 17/488,471, filed Sep. 29, 2021.
U.S. Appl. No. 17/470,035, filed Sep. 9, 2021.

*Primary Examiner* — Ammar T Hamid
(74) *Attorney, Agent, or Firm* — Pierce Atwood LLP

(57) ABSTRACT

A system that performs beam selection and beam merging using beam-specific signal quality metrics corresponding to a minimum noise floor. For example, a device may track a minimum noise floor for each beam, determine a highest minimum noise floor across the beams, and determine a noise floor ratio between the beam-specific minimum noise floor and the highest minimum noise floor. Using a combination of the noise floor ratio and signal-to-noise ratio (SNR) values, the device may perform beam selection by prioritizing low background noise as well as high SNR to select a pre-defined beam group. In addition, the device may use the noise floor ratio to perform beam merging and generate single-channel output audio data using the selected beam group. For example, the device may scale the beams based on a combination of the SNR value and the noise floor ratio.

20 Claims, 8 Drawing Sheets

(56) References Cited

U.S. PATENT DOCUMENTS

| | | |
|---|---|---|
| 9,173,025 B2 | 10/2015 | Dickins et al. |
| 9,224,393 B2 | 12/2015 | Kjems et al. |
| 9,275,642 B2 | 3/2016 | Abdossalami et al. |
| 9,338,551 B2 | 5/2016 | Thyssen et al. |
| 9,432,769 B1 | 8/2016 | Sundaram et al. |
| 9,456,276 B1 | 9/2016 | Chhetri |
| 9,530,406 B2 | 12/2016 | Oh |
| 9,653,060 B1 | 5/2017 | Hilmes et al. |
| 9,659,555 B1 | 5/2017 | Hilmes et al. |
| 9,689,960 B1 | 6/2017 | Barton et al. |
| 9,711,131 B2 | 7/2017 | Christoph |
| 9,747,920 B2 | 8/2017 | Ayrapetian et al. |
| 9,818,425 B1 | 11/2017 | Ayrapetian et al. |
| 9,966,059 B1 | 5/2018 | Ayrapetian et al. |
| 9,966,086 B1 | 5/2018 | Piersol et al. |
| 9,967,661 B1 | 5/2018 | Hilmes et al. |
| 9,973,849 B1 | 5/2018 | Zhang et al. |
| 10,187,721 B1 | 1/2019 | Mansour |
| 10,306,361 B2 | 5/2019 | Morton et al. |
| 10,339,954 B2 | 7/2019 | Kamdar et al. |
| 10,366,702 B2 | 7/2019 | Morton et al. |
| 10,403,299 B2 | 9/2019 | Wung et al. |
| 10,475,471 B2 | 11/2019 | Ebenezer |
| 10,499,139 B2 | 12/2019 | Ganeshkumar |
| 10,522,167 B1 | 12/2019 | Ayrapetian et al. |
| 10,598,543 B1 | 3/2020 | Mansour et al. |
| 10,657,981 B1 | 5/2020 | Mansour et al. |
| 10,771,894 B2 | 9/2020 | Janse et al. |
| 10,887,709 B1 | 1/2021 | Mansour et al. |
| 11,094,334 B2 | 8/2021 | Wang et al. |
| 11,200,908 B2 | 12/2021 | Liu et al. |
| 11,657,829 B2 | 5/2023 | Popovic et al. |
| 2004/0175006 A1 | 9/2004 | Kim et al. |
| 2008/0208538 A1 | 8/2008 | Visser et al. |
| 2008/0312918 A1 | 12/2008 | Kim |
| 2009/0034752 A1 | 2/2009 | Zhang et al. |
| 2013/0304476 A1 | 11/2013 | Kim et al. |
| 2014/0025374 A1 | 1/2014 | Lou |
| 2016/0205263 A1 | 7/2016 | Liu et al. |
| 2021/0312936 A1 | 10/2021 | Hu |
| 2022/0109929 A1* | 4/2022 | Ayrapetian ............... G06F 3/167 |
| 2022/0406286 A1 | 12/2022 | Yamanashi et al. |
| 2023/0055257 A1 | 2/2023 | Li |

* cited by examiner

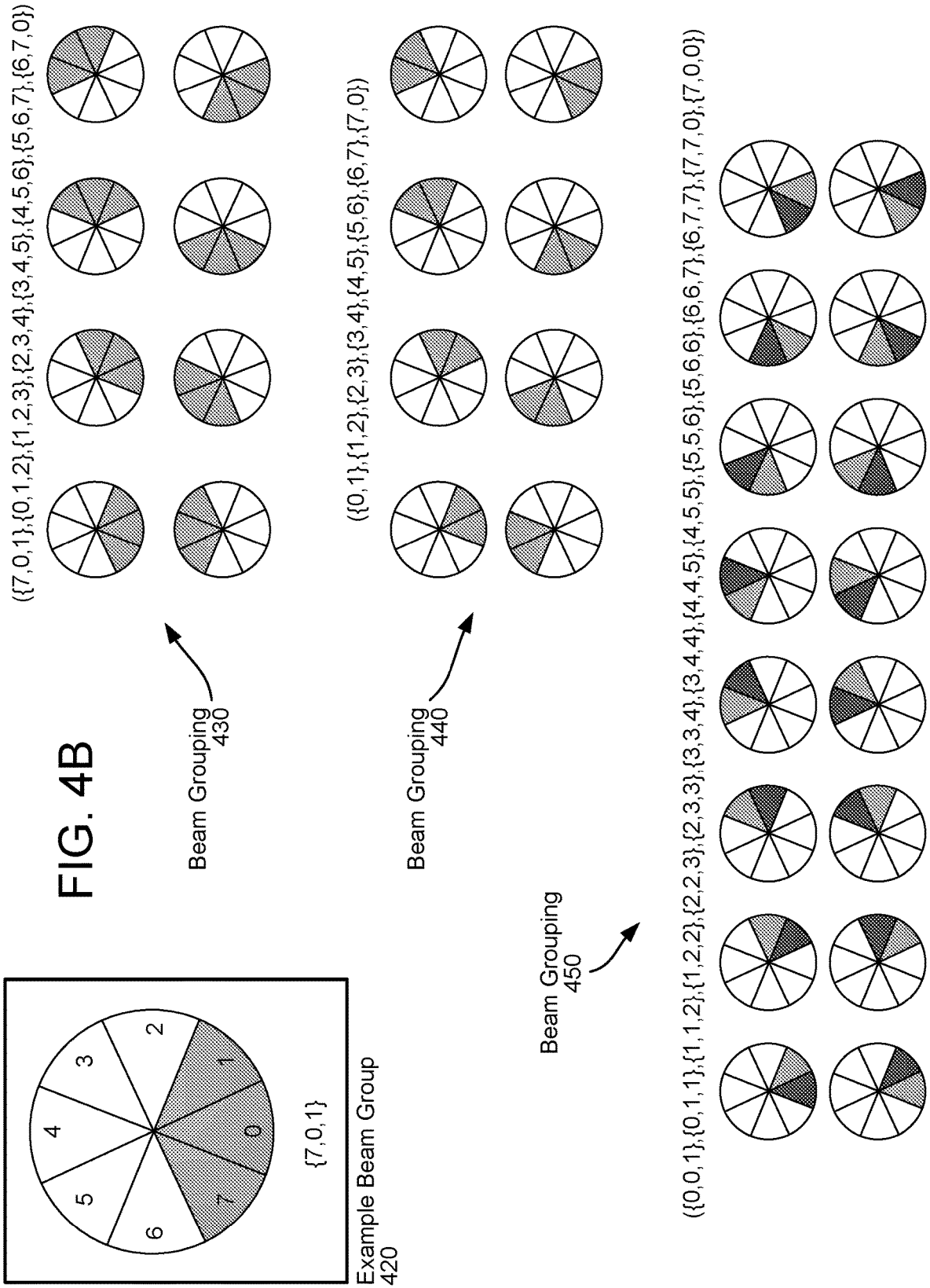

GROUP BEAM SELECTION AND BEAM MERGING

BACKGROUND

In audio systems, beamforming refers to techniques that are used to isolate audio from a particular direction. Beamforming may be particularly useful when filtering out noise from non-desired directions. Beamforming may be used for various tasks, including isolating voice commands to be executed by a speech-processing system.

Speech recognition systems have progressed to the point where humans can interact with computing devices using speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices, such as those with beamforming capability, to improve human-computer interactions.

BRIEF DESCRIPTION OF DRAWINGS

For a more complete understanding of the present disclosure, reference is now made to the following description taken in conjunction with the accompanying drawings.

FIGS. 4A-4B illustrate examples of a beam distribution and potential beam groupings according to embodiments of the present disclosure.

DETAILED DESCRIPTION

Figure 1:
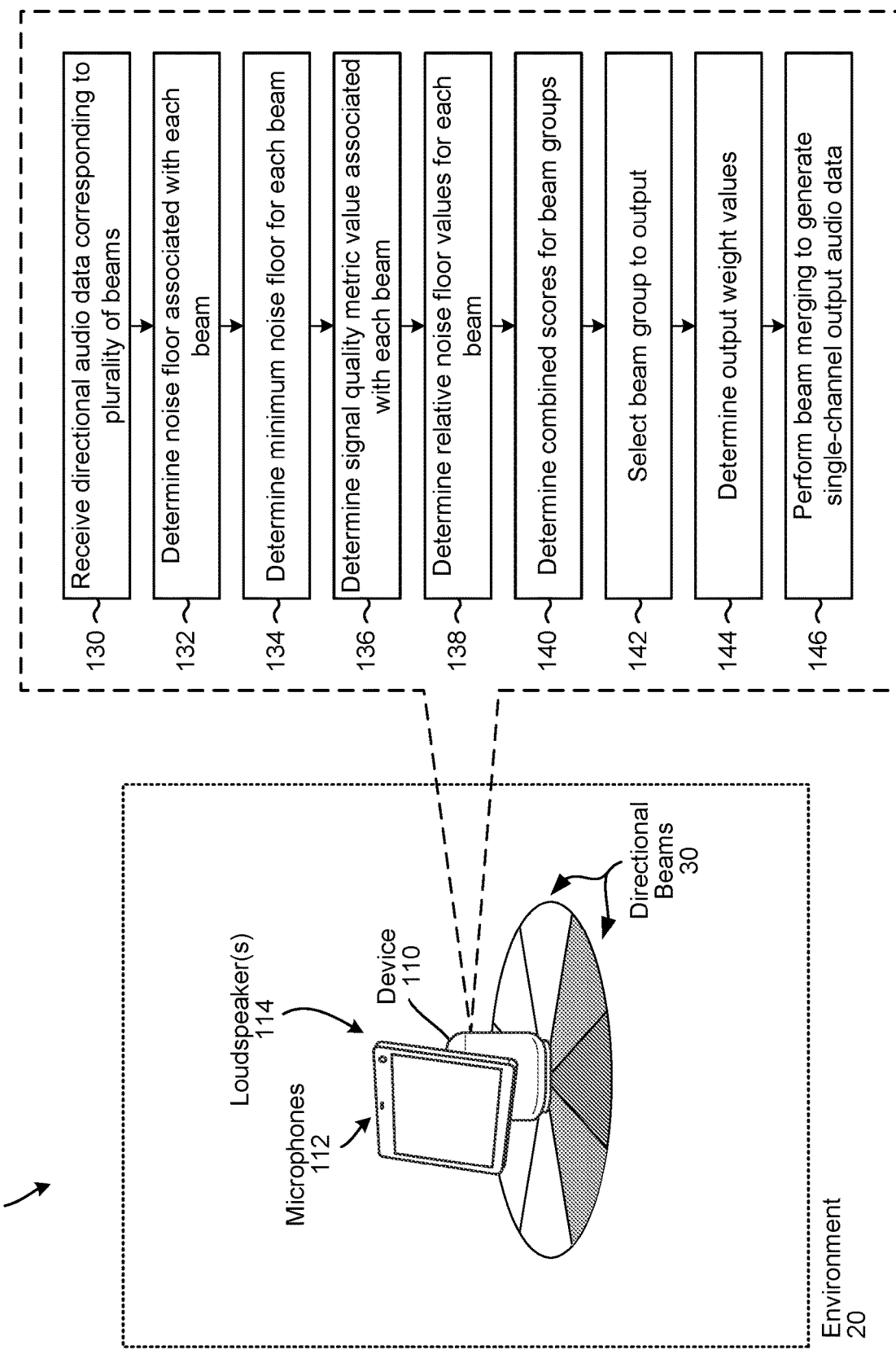
FIG. 1 illustrates a system for performing beam selection and beam merging according to embodiments of the present disclosure.

Electronic devices may be used to capture and process audio data. The audio data may be used for voice commands and/or may be output by loudspeakers as part of a communication session. In some examples, loudspeakers may generate output audio using playback audio data while a microphone generates microphone audio data. An electronic device may perform audio processing, such as acoustic echo cancellation (AEC), beamforming, adaptive interference cancellation (AIC), and/or the like, to remove undesired noise and isolate user speech to be used for voice commands and/or the communication session. For example, the audio processing may remove undesired noise such as background speech, ambient sounds in the environment, an "echo" signal corresponding to the playback audio data, and/or the like from the microphone audio data.

Certain devices capable of capturing speech for speech processing may operate a using a microphone array comprising multiple microphones, where beamforming techniques may be used to isolate desired audio including speech. One technique for beamforming involves a fixed beamformer unit that employs a filter-and-sum structure to boost an audio signal that originates from a desired direction (sometimes referred to as the look-direction) while largely attenuating audio signals that originate from other directions. While a fixed beamformer unit may effectively eliminate certain diffuse noise (e.g., undesired audio), which is detectable in similar energies from various directions, it may be less effective in eliminating noise emanating from a single source in a particular non-desired direction. In some examples, the beamformer unit may also incorporate an adaptive beamformer unit/noise canceller that can adaptively cancel noise from different directions depending on audio conditions.

As the direction of a signal of interest (usually speech) is not known a-priori and may change over time, the device may perform beamforming by simultaneously processing multiple beams, often uniformly distributed around 360 degrees. For example, the device may perform beamforming to generate a plurality of directional audio signals, with an individual directional audio signal isolating audio from a particular direction. As specific components used for speech processing may only be configured to operate on a single stream of audio data, however, the device may perform beam selection to select one or more directional audio signal(s) corresponding to the signal of interest, may perform beam merging to generate single-channel output audio data using the selected directional audio signal(s), and may send the output audio data to downstream components for wakeword detection and/or speech processing.

One potential drawback to this approach is that a beam selection component may operate using techniques that are focused on audio data quality rather than necessarily the content of the audio data. For example, a beam selection component may process the directional audio signals corresponding to multiple beams and choose the beam that most likely contains the user's speech based on signal quality metrics that only correspond to a magnitude of the directional audio signals, such as a signal-to-noise ratio (SNR). Such features, however, may not always prove adequate and may break down under noisy conditions. For example, a SNR beam selector often misidentifies highly fluctuated interference noise as the desired signal when significant, non-stationary noise is present, such as music or background speech. A poorly selected beam may reduce the effectiveness of wakeword detection and speech processing performance. Another known drawback in beam selection is beam switching between adjacent beams, especially during the speech utterance, which may occur when the speaker direction is between adjacent beams.

To improve beam selection and/or beam merging, devices, systems and methods are disclosed that determine beam-specific signal quality metrics corresponding to a minimum noise floor for each beam and uses these signal quality metrics to select a group of beams and perform beam merging to generate a combined output signal. For example, a device may track a minimum noise floor for each beam over time, determine a highest minimum noise floor across the beams, and determine a noise floor ratio between the beam-specific minimum noise floor and the highest minimum noise floor. Using a combination of the noise floor ratio and signal-to-noise ratio (SNR) values, the device may perform beam selection by prioritizing low background noise as well as high SNR to select a pre-defined beam group. In addition, the device may use the noise floor ratio to perform beam merging and generate single-channel output audio data using the selected beam group. For example, the device may scale the beams based on a combination of the SNR value and the noise floor ratio, such that the combined output includes a percentage of the selected beams based on a weighted sum corresponding to a magnitude of the beam and the relative noise floor.

FIG. 1 illustrates a system for performing beam selection and beam merging using a device according to embodiments of the present disclosure. For example, the system may be configured to receive or generate beamformed audio signals and process the beamformed audio signals to generate an output audio signal. Although FIG. 1, and other figures/discussion illustrate the operation of the system in a particular order, the steps described may be performed in a different order (as well as certain steps removed or added) without departing from the intent of the disclosure.

As illustrated in FIG. 1, a system 100 may include a device 110 that may include microphones 112 in a microphone array and/or one or more loudspeaker(s) 114. However, the disclosure is not limited thereto and the device 110 may include additional components without departing from the disclosure. While FIG. 1 illustrates the loudspeaker(s) 114 being internal to the device 110, the disclosure is not limited thereto and the loudspeaker(s) 114 may be external to the device 110 without departing from the disclosure. For example, the loudspeaker(s) 114 may be separate from the device 110 and connected to the device 110 via a wired connection and/or a wireless connection without departing from the disclosure.

To detect user speech or other audio, the device 110 may use the microphones 112 to generate microphone audio data that captures audio in a room (e.g., an environment 20) in which the device 110 is located. As is known and as used herein, "capturing" an audio signal includes a microphone transducing audio waves (e.g., sound waves) of captured sound to an electrical signal and a codec digitizing the signal to generate the microphone audio data. In some examples, the microphones 112 may be included in a microphone array, such as an array of eight microphones. However, the disclosure is not limited thereto and the device 110 may include any number of microphones 112 without departing from the disclosure.

The device 110 may be an electronic device configured to send audio data to and/or receive audio data. For example, the device 110 (e.g., local device) may receive playback audio data $x_r(t)$ (e.g., far-end reference audio data) from a remote device and the playback audio data $x_r(t)$ may include remote speech, music, and/or other output audio. In some examples, the user may be listening to music or a program and the playback audio data $x_r(t)$ may include the music or other output audio (e.g., talk-radio, audio corresponding to a broadcast, text-to-speech output, etc.). However, the disclosure is not limited thereto and in other examples the user may be involved in a communication session (e.g., conversation between the user and a remote user local to the remote device) and the playback audio data $x_r(t)$ may include remote speech originating at the remote device. In both examples, the device 110 may generate output audio corresponding to the playback audio data $x_r(t)$ using the one or more loudspeaker(s) 114. While generating the output audio, the device 110 may capture microphone audio data $x_m(t)$ (e.g., input audio data) using the microphones 112. In addition to capturing desired speech (e.g., the microphone audio data includes a representation of local speech from a user), the device 110 may capture a portion of the output audio generated by the loudspeaker(s) 114 (including a portion of the music and/or remote speech), which may be referred to as an "echo" or echo signal, along with additional acoustic noise (e.g., undesired speech, ambient acoustic noise in an environment around the device 110, etc.), as discussed in greater detail below.

In some examples, the microphone audio data $x_m(t)$ may include a voice command, which may be indicated by a keyword (e.g., wakeword). For example, the device 110 detect that the wakeword is represented in the microphone audio data $x_m(t)$ and may cause language processing to be performed on the microphone audio data $x_m(t)$. Thus, a language processing component associated with the device 110 and/or a remote device may determine a voice command represented in the microphone audio data $x_m(t)$ and may perform an action corresponding to the voice command (e.g., execute a command, send an instruction to the device 110 and/or other devices to execute the command, etc.). In some examples, to determine the voice command the language processing component may perform Automatic Speech Recognition (ASR) processing, Natural Language Understanding (NLU) processing and/or command processing. The voice commands may control the device 110, audio devices (e.g., play music over loudspeaker(s) 114, capture audio using microphones 112, or the like), multimedia devices (e.g., play videos using a display, such as a television, computer, tablet or the like), smart home devices (e.g., change temperature controls, turn on/off lights, lock/unlock doors, etc.) or the like.

Additionally or alternatively, in some examples the device 110 may send the microphone audio data $x_m(t)$ to the remote device as part of a Voice over Internet Protocol (VoIP) communication session or the like. For example, the device 110 may send the microphone audio data $x_m(t)$ to the remote device and may receive the playback audio data $x_r(t)$ from the remote device. During the communication session, the device 110 may also detect the keyword (e.g., wakeword) represented in the microphone audio data $x_m(t)$ and send a portion of the microphone audio data $x_m(t)$ to the language processing component in order for the language processing component to determine a voice command.

Prior to sending the microphone audio data $x_m(t)$ to the language processing component, the device 110 may perform audio processing to isolate local speech captured by the microphones 112 and/or to suppress unwanted audio data (e.g., echoes and/or noise). For example, the device 110 may perform beamforming (e.g., operate microphones 112 using beamforming techniques) to isolate speech or other input audio corresponding to target direction(s). Additionally or alternatively, the device 110 may perform acoustic echo cancellation (AEC), adaptive interference cancellation (AIC), residual echo suppression (RES), and/or other audio processing without departing from the disclosure.

In audio systems, beamforming refers to techniques that are used to isolate audio from a particular direction in a multi-directional audio capture system. Beamforming may be particularly useful when filtering out noise from non-desired directions. Beamforming may be used for various tasks, including isolating voice commands to be executed by a speech-processing system. To illustrate an example, the device 110 may perform beamforming using the input audio data to generate a plurality of audio signals (e.g., beamformed audio data) corresponding to particular directions. For example, the plurality of audio signals may include a first audio signal corresponding to a first direction, a second audio signal corresponding to a second direction, a third audio signal corresponding to a third direction, and so on. The device 110 may then process portions of the beamformed audio data separately to isolate the desired speech and/or remove or reduce noise.

In some examples, the device 110 may select beamformed audio data corresponding to two or more directions for further processing. For example, the device 110 may combine beamformed audio data corresponding to multiple directions and send the combined beamformed audio data to the language processing component. As illustrated in FIG. 1, the device 110 may determine signal quality metric values, such as a signal-to-noise ratio (SNR) value, for individual directions (e.g., directional beams 30) and frequency bands and may use the signal quality metric values to select a beam group with which to generate output audio data. As will be described in greater detail below, the device 110 may then determine normalized values α for each of the directional beams 30 associated with the selected beam group and generate output audio data by performing beam merging.

As illustrated in FIG. 1, the device 110 may receive (130) directional audio data corresponding to a plurality of beams. For example, the microphones 112 may generate first audio data and a beamformer component (not illustrated) may perform beamforming using the first audio data to generate the directional audio data. While not illustrated in FIG. 1, an audio processing component may be configured to perform audio processing on the directional audio data prior to step 130. For example, the audio processing component may be configured to synchronize a first portion of the first audio data (e.g., first channel) corresponding to a first microphone 112a with a second portion of the first audio data (e.g., second channel) corresponding to a second microphone 112b. In addition to synchronizing each of the individual microphone channels included in the first audio data, the audio processing component may perform additional audio processing such as echo cancellation, noise suppression, and/or the like, although the disclosure is not limited thereto.

Using the directional audio data, the device 110 may determine (132) a noise floor associated with each directional beam and then determine (134) a minimum noise floor value for each directional beam, as described in greater detail below with regard to FIG. 3. Using the minimum noise floor values, the device 110 may determine (136) a signal quality metric value associated with each directional beam and determine (138) relative noise floor values for each directional beam, as described in greater detail below with regard to FIG. 3 and/or FIG. 6.

As described in greater detail below with regard to FIG. 3 and FIG. 6, the device 110 may determine (140) combined scores for the beam groups. For example, the device 110 may use Equation [12] to determine a weighted sum value $\beta_{sum}$ of the SNR values ($SNR_i$) for each beam group. Based on the combined scores (e.g., weighted sum values $\beta_{sum}$), the device 110 may select (142) a beam group to output (e.g., associated with a highest weighted sum value), determine (144) output weight values associated with the beam group, and may perform (146) beam merging to generate single-channel output audio data.

As discussed above, the device 110 may perform beamforming (e.g., perform a beamforming operation to generate beamformed audio data corresponding to individual directions). As used herein, beamforming (e.g., performing a beamforming operation) corresponds to generating a plurality of directional audio signals (e.g., beamformed audio data) corresponding to individual directions relative to the microphone array. For example, the beamforming operation may individually filter input audio signals generated by multiple microphones 112 in the microphone array (e.g., first audio data associated with a first microphone, second audio data associated with a second microphone, etc.) in order to separate audio data associated with different directions. Thus, first beamformed audio data corresponds to audio data associated with a first direction, second beamformed audio data corresponds to audio data associated with a second direction, and so on. In some examples, the device 110 may generate the beamformed audio data by boosting an audio signal originating from the desired direction (e.g., look direction) while attenuating audio signals that originate from other directions, although the disclosure is not limited thereto.

To perform the beamforming operation, the device 110 may apply directional calculations to the input audio signals. In some examples, the device 110 may perform the directional calculations by applying filters to the input audio signals using filter coefficients associated with specific directions. For example, the device 110 may perform a first directional calculation by applying first filter coefficients to the input audio signals to generate the first beamformed audio data and may perform a second directional calculation by applying second filter coefficients to the input audio signals to generate the second beamformed audio data.

The filter coefficients used to perform the beamforming operation may be calculated offline (e.g., preconfigured ahead of time) and stored in the device 110. For example, the device 110 may store filter coefficients associated with hundreds of different directional calculations (e.g., hundreds of specific directions) and may select the desired filter coefficients for a particular beamforming operation at runtime (e.g., during the beamforming operation). To illustrate an example, at a first time the device 110 may perform a first beamforming operation to divide input audio data into 36 different portions, with each portion associated with a specific direction (e.g., 10 degrees out of 360 degrees) relative to the device 110. At a second time, however, the device 110 may perform a second beamforming operation to divide input audio data into 6 different portions, with each portion associated with a specific direction (e.g., 60 degrees out of 360 degrees) relative to the device 110.

These directional calculations may sometimes be referred to as "beams" by one of skill in the art, with a first directional calculation (e.g., first filter coefficients) being referred to as a "first beam" corresponding to the first direction, the second directional calculation (e.g., second filter coefficients) being referred to as a "second beam" corresponding to the second direction, and so on. Thus, the device 110 stores hundreds of "beams" (e.g., directional calculations and associated filter coefficients) and uses the "beams" to perform a beamforming operation and generate a plurality of beamformed audio signals. However, "beams" may also refer to the output of the beamforming operation (e.g., plurality of beamformed audio signals). Thus, a first beam may correspond to first beamformed audio data associated with the first direction (e.g., portions of the input audio signals corresponding to the first direction), a second beam may correspond to second beamformed audio data associated with the second direction (e.g., portions of the input audio signals corresponding to the second direction), and so on. For ease of explanation, as used herein "beams" refer to the beamformed audio signals that are generated by the beamforming operation. Therefore, a first beam corresponds to first audio data associated with a first direction, whereas a first directional calculation corresponds to the first filter coefficients used to generate the first beam.

An audio signal is a representation of sound and an electronic representation of an audio signal may be referred to as audio data, which may be analog and/or digital without departing from the disclosure. For ease of illustration, the disclosure may refer to either audio data (e.g., reference audio data or playback audio data, microphone audio data or input audio data, etc.) or audio signals (e.g., playback signals, microphone signals, etc.) without departing from the disclosure. For example, some audio data may be referred to as playback audio data, microphone audio data, error audio data, output audio data, and/or the like. Additionally or alternatively, this audio data may be referred to as audio signals such as a playback signal, microphone signal, error signal, output audio data, and/or the like without departing from the disclosure.

Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as acoustic echo cancellation (AEC), noise reduction (NR) processing, adaptive interference cancellation (AIC) processing, and/or the like. For example, the device 110 may convert the time-domain signal to the subband-domain by applying a band-pass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

Playback audio data $x_r(t)$ (e.g., far-end reference signal) corresponds to audio data that will be output by the loudspeaker(s) 114 to generate playback audio (e.g., echo signal $y(t)$). For example, the device 110 may stream music or output speech associated with a communication session (e.g., audio or video telecommunication). In some examples, the playback audio data may be referred to as far-end reference audio data, loudspeaker audio data, and/or the like without departing from the disclosure. For ease of illustration, the following description will refer to this audio data as playback audio data or reference audio data. As noted above, the playback audio data may be referred to as playback signal(s) $x_r(t)$ without departing from the disclosure.

Microphone audio data $x_m(t)$ corresponds to audio data that is captured by one or more microphones 112 prior to the device 110 performing audio processing such as AEC processing or beamforming. The microphone audio data $x_m(t)$ may include local speech $s(t)$ (e.g., an utterance, such as near-end speech generated by the user), an "echo" signal $y(t)$ (e.g., portion of the playback audio $x_r(t)$ captured by the microphones 112), acoustic noise $n(t)$ (e.g., ambient noise in an environment around the device 110), and/or the like. As the microphone audio data is captured by the microphones 112 and captures audio input to the device 110, the microphone audio data may be referred to as input audio data, near-end audio data, and/or the like without departing from the disclosure. For ease of illustration, the following description will refer to this signal as microphone audio data. As noted above, the microphone audio data may be referred to as a microphone signal without departing from the disclosure.

An "echo" signal $y(t)$ corresponds to a portion of the playback audio that reaches the microphones 112 (e.g., portion of audible sound(s) output by the loudspeaker(s) 114 that is recaptured by the microphones 112) and may be referred to as an echo or echo data $y(t)$. If the device 110 includes a single loudspeaker 114, an acoustic echo canceller (AEC) may perform acoustic echo cancellation for one or more microphones 112. However, if the device 110 includes multiple loudspeakers 114, a multi-channel acoustic echo canceller (MC-AEC) may perform acoustic echo cancellation. For ease of explanation, the disclosure may refer to removing estimated echo audio data from microphone audio data to perform acoustic echo cancellation. The system 100 removes the estimated echo audio data by subtracting the estimated echo audio data from the microphone audio data, thus cancelling the estimated echo audio data. This cancellation may be referred to as "removing," "subtracting" or "cancelling" interchangeably without departing from the disclosure.

In some examples, the device 110 may perform echo cancellation using the playback audio data. However, the disclosure is not limited thereto, and the device 110 may perform echo cancellation using the microphone audio data, such as adaptive noise cancellation (ANC), adaptive interference cancellation (AIC), and/or the like, without departing from the disclosure. As used herein, isolated audio data corresponds to audio data after the device 110 performs audio processing (e.g., AEC processing, RES processing, AIC processing, ANC processing, and/or the like) to isolate the local speech $s(t)$.

In some examples, such as when performing echo cancellation using ANC/AIC processing, the device 110 may include a beamformer that may perform audio beamforming on the microphone audio data to determine target audio data (e.g., audio data on which to perform echo cancellation). The beamformer may include a fixed beamformer (FBF) and/or an adaptive noise canceller (ANC), enabling the beamformer to isolate audio data associated with a particular direction. The FBF may be configured to form a beam in a specific direction so that a target signal is passed and all other signals are attenuated, enabling the beamformer to select a particular direction (e.g., directional portion of the microphone audio data). In contrast, a blocking matrix may be configured to form a null in a specific direction so that the target signal is attenuated and all other signals are passed (e.g., generating non-directional audio data associated with the particular direction).

The beamformer may generate fixed beamforms (e.g., outputs of the FBF) or may generate adaptive beamforms (e.g., outputs of the FBF after removing the non-directional audio data output by the blocking matrix) using a Linearly Constrained Minimum Variance (LCMV) beamformer, a Minimum Variance Distortion-less Response (MVDR) beamformer or other beamforming techniques. For example, the beamformer may receive audio input, determine six beamforming directions and output six fixed beamform outputs and six adaptive beamform outputs. In some examples, the beamformer may generate six fixed beamform outputs, six LCMV beamform outputs and six MVDR beamform outputs, although the disclosure is not limited thereto. Using the beamformer and techniques discussed below, the device 110 may determine target signals on which to perform acoustic echo cancellation using the AEC. However, the disclosure is not limited thereto and the device 110 may perform AEC without beamforming the microphone audio data without departing from the present disclosure. Additionally or alternatively, the device 110 may perform beamforming using other techniques known to one of skill in the art and the disclosure is not limited to the techniques described above.

As discussed above, the device 110 may include a microphone array having multiple microphones 112 that are laterally spaced from each other so that they can be used by audio beamforming components to produce directional audio signals. The microphones 112 may, in some instances, be dispersed around a perimeter of the device 110 in order to apply beampatterns to audio signals based on sound captured by the microphones. For example, the microphones 112 may be positioned at spaced intervals along a perimeter of the device 110, although the present disclosure is not limited thereto. In some examples, the microphone 112 may be spaced on a substantially vertical surface of the device 110 and/or a top surface of the device 110. Each of the microphones 112 is omnidirectional, and beamforming technology may be used to produce directional audio signals based on audio data generated by the microphones 112. In other embodiments, the microphones 112 may have directional audio reception, which may remove the need for subsequent beamforming.

Using the microphones 112, the device 110 may employ beamforming techniques to isolate desired sounds for purposes of converting those sounds into audio signals for speech processing by the system. Beamforming is the process of applying a set of beamformer coefficients to audio signal data to create beampatterns, or effective directions of gain or attenuation. In some implementations, these volumes may be considered to result from constructive and destructive interference between signals from individual microphones 112 in a microphone array.

The device 110 may include a beamformer that may include one or more audio beamformers or beamforming components that are configured to generate an audio signal that is focused in a particular direction (e.g., direction from which user speech has been detected). More specifically, the beamforming components may be responsive to spatially separated microphone elements of the microphone array to produce directional audio signals that emphasize sounds originating from different directions relative to the device 110, and to select and output one of the audio signals that is most likely to contain user speech.

Audio beamforming, also referred to as audio array processing, uses a microphone array having multiple microphones 112 that are spaced from each other at known distances. Sound originating from a source is received by each of the microphones 112. However, because each microphone is potentially at a different distance from the sound source, a propagating sound wave arrives at each of the microphones 112 at slightly different times. This difference in arrival time results in phase differences between audio signals produced by the microphones. The phase differences can be exploited to enhance sounds originating from chosen directions relative to the microphone array.

Beamforming uses signal processing techniques to combine signals from the different microphones so that sound signals originating from a particular direction are emphasized while sound signals from other directions are deemphasized. More specifically, signals from the different microphones 112 are combined in such a way that signals from a particular direction experience constructive interference, while signals from other directions experience destructive interference. The parameters used in beamforming may be varied to dynamically select different directions, even when using a fixed-configuration microphone array.

As described above, the device 110 may generate microphone audio data $x_m(t)$ using microphones 112. For example, a first microphone 112a may generate first microphone audio data $x_{m1}(t)$ in a time domain, a second microphone 112b may generate second microphone audio data $x_{m2}(t)$ in the time domain, and so on. As used herein, a time domain signal may be comprised of a sequence of individual samples of audio data, such that x(t) denotes an individual sample that is associated with a time t.

While the microphone audio data x(t) is comprised of a plurality of samples, in some examples the device 110 may group a plurality of samples and process them together. For example, the device 110 may group a number of samples together in a frame to generate microphone audio data x(n). As used herein, microphone audio data x(n) corresponds to the time-domain signal and identifies an individual frame (e.g., fixed number of samples s) associated with a frame index n.

Additionally or alternatively, the device 110 may convert microphone audio data x(n) from the time domain to the frequency domain or subband domain. For example, the device 110 may perform Discrete Fourier Transforms (DFTs) (e.g., Fast Fourier transforms (FFTs), short-time Fourier Transforms (STFTs), and/or the like) to generate microphone audio data X(n, k) in the frequency domain or the subband domain. As used herein, microphone audio data X(n, k) corresponds to the frequency-domain signal and identifies an individual frame associated with frame index n and tone index k. Thus, while the microphone audio data x(t) corresponds to time indexes, the microphone audio data x(n) and the microphone audio data X(n, k) corresponds to frame indexes.

A Fast Fourier Transform (FFT) is a Fourier-related transform used to determine the sinusoidal frequency and phase content of a signal and performing a FFT operation produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data X(n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency domain representation of that same waveform comprises a plurality of discrete amplitude values, where each amplitude value is for a different tone or "bin." So, for example, if the sound wave consisted solely of a pure sinusoidal 1 kHz tone, then the frequency domain representation would consist of a discrete amplitude spike in the bin containing 1 kHz, with the other bins at zero. In other words, each tone "k" is a frequency index (e.g., frequency bin). To illustrate an example, the system 100 may apply FFT processing to the time-domain microphone audio data x(n), producing the frequency-domain microphone audio data X(n,k), where the tone index "k" (e.g., frequency index) ranges from 0 to K and "n" is a frame index ranging from 0 to N. Thus, the history of the values across iterations is provided by the frame index "n", which ranges from 1 to N and represents a series of samples over time.

In some examples, the device 110 may perform a K-point FFT on a time-domain signal. For example, if the device 110 performs a 256-point FFT on a 16 kHz time-domain signal, the output is 256 complex numbers, where each complex number corresponds to a value at a frequency in increments of 16 kHz/256, such that there is 125 Hz between points, with point 0 corresponding to 0 Hz and point 255 corresponding to 16 kHz. Thus, each tone index in the 256-point FFT corresponds to a frequency range (e.g., subband) in the 16 kHz time-domain signal. While the example above refers to the frequency range being divided into 256 different subbands (e.g., tone indexes), the disclosure is not limited thereto and the system 100 may divide the frequency range into K different subbands (e.g., K indicates an FFT size). In addition, while the example described above refers to the tone index being generated using the K-point FFT operation, the disclosure is not limited thereto. Instead, the tone index may be generated using Short-Time Fourier Transform (STFT), generalized Discrete Fourier Transform (DFT) and/or other transforms known to one of skill in the art (e.g., discrete cosine transform, non-uniform filter bank, etc.) without departing from the disclosure.

The system 100 may include multiple microphones 112, with a first channel m corresponding to a first microphone 112a, a second channel (m+1) corresponding to a second microphone 112b, and so on until a final channel (M) that corresponds to microphone 112M. While some drawings illustrate four channels or eight channels, the disclosure is not limited thereto and the number of channels may vary. For the purposes of discussion, an example of system 100 includes "M" microphones 112 (M>1) for hands free near-end/far-end distant speech recognition applications.

While the examples described above refer to the microphone audio data $x_m(t)$, the disclosure is not limited thereto and the same techniques apply to the playback audio data $x_r(t)$ without departing from the disclosure. Thus, playback audio data $x_r(t)$ indicates a specific time index t from a series of samples in the time-domain, playback audio data $x_r(n)$ indicates a specific frame index n from series of frames in the time-domain, and playback audio data $X_r(n, k)$ indicates a specific frame index n and frequency index k from a series of frames in the frequency-domain.

Prior to converting the microphone audio data $x_m(n)$ and the playback audio data $x_r(n)$ to the frequency-domain, in some examples the device 110 may first perform time-alignment to align the playback audio data $x_r(n)$ with the microphone audio data $x_m(n)$. For example, due to nonlinearities and variable delays associated with sending the playback audio data $x_r(n)$ to external loudspeaker(s) using a wireless connection, the playback audio data $x_r(n)$ may not synchronized with the microphone audio data $x_m(n)$. This lack of synchronization may be due to a propagation delay (e.g., fixed time delay) between the playback audio data $x_r(n)$ and the microphone audio data $x_m(n)$, clock jitter and/or clock skew (e.g., difference in sampling frequencies between the device 110 and the loudspeaker(s)), dropped packets (e.g., missing samples), and/or other variable delays.

To perform the time alignment, the device 110 may adjust the playback audio data $x_r(n)$ to match the microphone audio data $x_m(n)$. For example, the device 110 may adjust an offset between the playback audio data $x_r(n)$ and the microphone audio data $x_m(n)$ (e.g., adjust for propagation delay), may add/subtract samples and/or frames from the playback audio data $x_r(n)$ (e.g., adjust for drift), and/or the like. In some examples, the device 110 may modify both the microphone audio data and the playback audio data in order to synchronize the microphone audio data and the playback audio data. However, performing nonlinear modifications to the microphone audio data results in first microphone audio data associated with a first microphone to no longer be synchronized with second microphone audio data associated with a second microphone. Thus, the device 110 may instead modify only the playback audio data so that the playback audio data is synchronized with the first microphone audio data, although the disclosure is not limited thereto.

Figure 2:
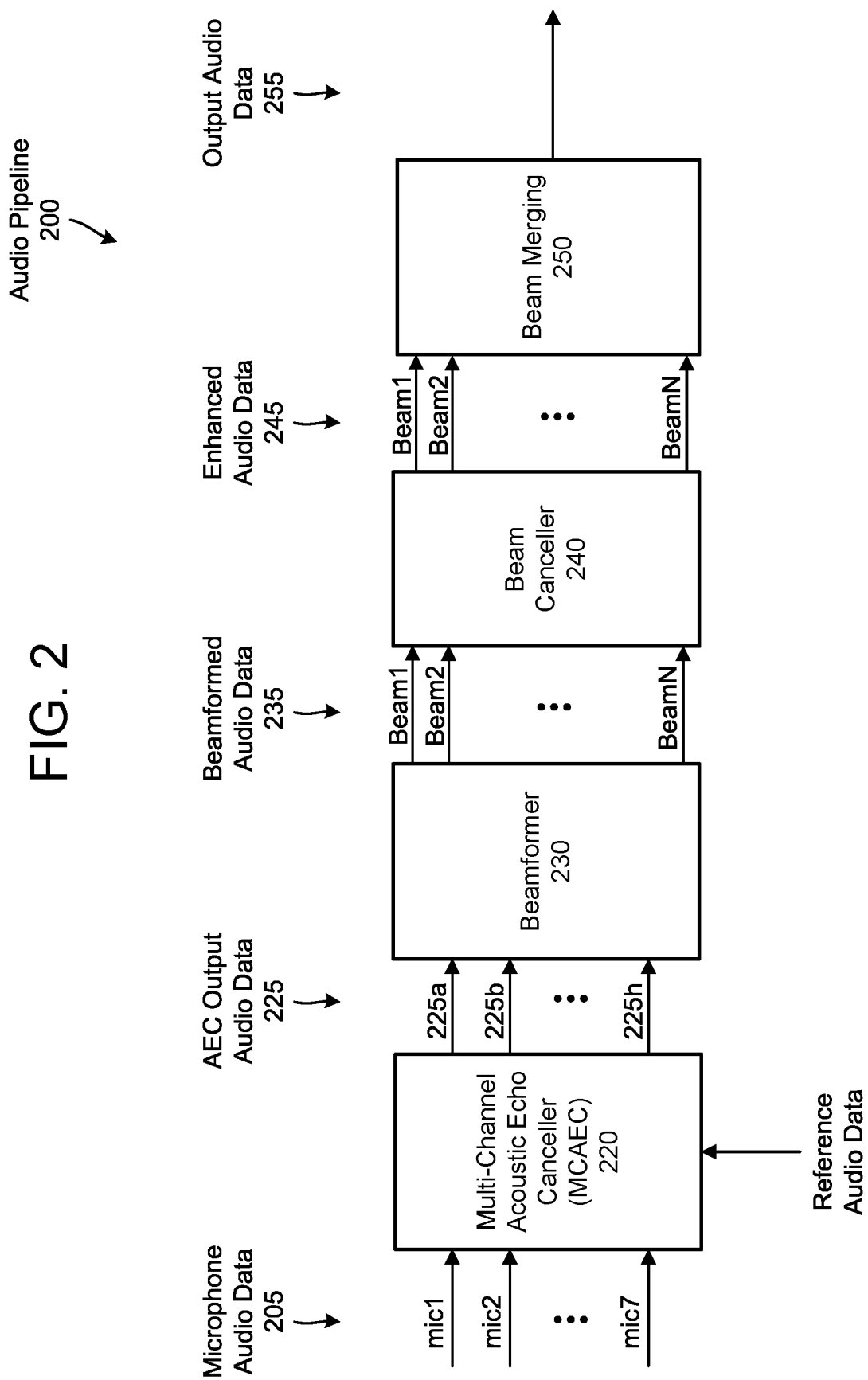
FIG. 2 illustrates a component diagram for an audio pipeline according to embodiments of the present disclosure.

FIG. 2 illustrates a component diagram for an audio pipeline according to embodiments of the present disclosure. As illustrated in FIG. 2, an audio pipeline 200 may include audio processing components configured to perform a variety of audio processing to isolate the desired speech and generate output audio data. For example, the audio processing components may include a multi-channel acoustic echo canceller (MCAEC) 220 component configured to perform echo cancellation to remove an echo signal from the microphone audio data. After performing echo cancellation, the audio processing components may include a beamformer component 230, beam canceller component 240, and a beam merging component 250, although the disclosure is not limited thereto.

As illustrated in FIG. 2, the MCAEC component 220 may receive microphone audio data 205 (e.g., mic1, mic2, . . . micM) from the microphones 112 and may be configured to perform echo cancellation to generate AEC output audio data 225. As the audio pipeline 200 is configured to process microphone audio data 205 generated by multiple microphones, the audio pipeline 200 includes the MCAEC component 220 configured to perform multi-channel echo cancellation. For example, the MCAEC component 220 may receive microphone audio data 205 (e.g., microphone audio data $x_m(t)$) from two or more microphones 112 and may perform echo cancellation individually for each of the microphones 112. Thus, the microphone audio data 205 may include an individual channel for each microphone, such as a first channel mic associated with a first microphone 112a, a second channel mic2 associated with a second microphone 112b, and so on until a final channel micM associated with an M-th microphone 112m. While FIG. 2 illustrates an example in which the microphone audio data 205 includes seven microphone channels, the disclosure is not limited thereto and the number of microphone channels may vary without departing from the disclosure.

Similarly, the MCAEC component 220 may receive reference audio data 215 (e.g., playback audio data $x_r(t)$) associated with one or more loudspeakers 114 of the device 110. In some examples, the reference audio data 215 may correspond to a single loudspeaker 114, such that the reference audio data 215 only includes a single channel. However, the disclosure is not limited thereto, and in other examples the reference audio data 215 may correspond to multiple loudspeakers 114 without departing from the disclosure. For example, the reference audio data 215 may include five separate channels, such as a first channel corresponding to a first loudspeaker 114a (e.g., woofer), a second channel corresponding to a second loudspeaker 114b (e.g., tweeter), and three additional channels corresponding to three additional loudspeakers 114c-114e (e.g., midrange) without departing from the disclosure. The disclosure is not limited thereto, however, and the number of loudspeakers may vary without departing from the disclosure.

In some examples, the reference signal may correspond to playback audio data used to generate output audio. For example, the device 110 may receive the playback audio data and may generate output audio by sending the playback audio data to one or more loudspeaker(s) 114 associated with the device 110. Thus, the AEC component 220 may receive the playback audio data (e.g., reference audio data 215) and may use adaptive filters to generate the reference signal, which corresponds to an estimated echo signal represented in the microphone audio data 205. By subtracting the reference signal from the microphone audio data 205, the MCAEC component 220 may remove at least a portion of the echo signal and isolate local speech represented in the microphone audio data 205. For example, the MCAEC component 220 may generate a first channel of AEC output audio data 225a corresponding to the first microphone 112a, a second channel of AEC output audio data 225b corresponding to the second microphone 112b, and so on. Thus, the device 110 may process the individual channels separately.

As illustrated in FIG. 2, in some examples the audio pipeline 200 may include a beamformer component 230 that may receive the AEC output audio data 225 and perform beamforming to generate beamformed audio data 235. To illustrate an example, the beamformer component 230 may generate directional audio data corresponding to N unique directions (e.g., N unique beams, such as [Beam1, Beam2, . . . BeamN]). For example, the beamformed audio data 235 may comprise a plurality of audio signals that includes a first audio signal corresponding to a first direction, a second audio signal corresponding to a second direction, a third audio signal corresponding to a third direction, and so on. The number of unique directions may vary without departing from the disclosure, and may be similar or different from the number of microphones 112.

As described above, the device 110 may include a first number of microphones (e.g., M) and generate a second number of beams (e.g., N). However, the disclosure is not limited thereto and the device 110 may include any number of microphone channels and generate any number of beams without departing from the disclosure. Thus, the first number of microphones (e.g., M) and the second number of beams (e.g., N) may be the same or different without departing from the disclosure. Additionally or alternatively, while FIG. 2 illustrates the beamformer component 230 performing beamforming processing on the AEC output audio data 225, the disclosure is not limited thereto. In some examples, the beamformer component 230 may perform beamforming processing on the microphone audio data 205 without departing from the disclosure.

In the example illustrated in FIG. 2, the beamformer component 230 may correspond to a Fixed Beamformer (FBF) component and may be followed by beam canceller component 240, which may correspond to an adaptive beamformer (ABF) component, although the disclosure is not limited thereto. The beam canceller component 240 may be configured to perform beam to beam cancellation using the beamformed audio data 235 to generate enhanced audio data 245. In order to isolate desired speech, the beam canceller component 240 may dynamically select target signal(s) and/or reference signal(s). Thus, in some examples the target signal(s) and/or the reference signal(s) may be continually changing over time based on speech, acoustic noise(s), ambient noise(s), and/or the like in an environment around the device 110. For example, the beam canceller component 240 may select the target signal(s) by detecting speech, based on signal strength values or signal quality metrics (e.g., signal-to-noise ratio (SNR) values, average power values, etc.), and/or using other techniques or inputs, although the disclosure is not limited thereto.

As an example of other techniques or inputs, the device 110 may capture video data corresponding to the input audio data, analyze the video data using computer vision processing (e.g., facial recognition, object recognition, or the like) to determine that a user is associated with a first direction, and select the target signal(s) by selecting the first audio signal corresponding to the first direction. Similarly, the adaptive beamformer may identify the reference signal(s) based on the signal strength values and/or using other inputs without departing from the disclosure. Thus, the target signal(s) and/or the reference signal(s) selected by the beam canceller component 240 may vary, resulting in different filter coefficient values over time.

As illustrated in FIG. 2, a beam merging component 250 may receive the enhanced audio data 245 and generate output audio data 255. In some examples, the beam merging component 250 may select portions of the enhanced audio data 245 (e.g., enhanced directional audio data) corresponding to two or more directions and generate the output audio data 255 using a weighted sum that combines these portions of the enhanced audio data 245, as described in greater detail below with regard to FIGS. 3 and 6.

While FIG. 2 illustrates an example of the audio pipeline 200 including the beamformer component 230 and the beam canceller component 240, the disclosure is not limited thereto. In some examples, the beamformer component 230 may correspond to a Fixed Beamformer (FBF) component configured to generate directional audio data in a plurality of directions, while the beam canceller component 240 may correspond to an Adaptive Beamformer (ABF) component configured to perform adaptive beamforming and generate the enhanced audio data 245, although the disclosure is not limited thereto.

While FIG. 2 illustrates the audio pipeline 200 processing each of the microphone channels independently, the disclosure is not limited thereto. In some examples, the audio pipeline 200 may process only a portion of the microphone channels (e.g., the AEC output audio data 225 only corresponds 1-3 channels) and/or combine the multiple microphone channels into a single output (e.g., the AEC output audio data 225 corresponds to a single channel) without departing from the disclosure.

As part of beam merging, the device 110 may merge a set of neighboring beams while maintaining temporal continuity between frames. As will be described in greater detail below with regard to FIG. 4B, the device 110 may define a first number (e.g., C) of beam groups, such that each beam group c contains multiple beams that are spatially close to each other. Using the pre-defined set of beam groups that contain spatially close beams, the device 110 may eliminate or reduce a number of disjointed transitions that may cause distortion in the output signal. In addition, the device 110 may use a weight/gain parameter to introduce a bias for preferable directions (e.g., directions likely to correspond to the user) based on a relative position of the device 110. These weight/gain parameters may also provide an additional preference for certain beam groups over other beam groups based on a typical implementation of the device 110, although the disclosure is not limited thereto.

As will be described in greater detail below, the device 110 may perform beam merging by identifying a beam group with the highest overall SNR plus gain value (e.g., gain parameter is multiplied with the corresponding beam group during SNR estimation), determining normalized weights based on a weighted sum calculated using the SNR and noise floor ratio values, and generating the single-channel output audio data 255 by applying the normalized weights to the selected beam group.

In some examples, the device 110 may determine beam-specific signal quality metrics corresponding to a minimum noise floor for each beam and use these signal quality metrics to select a beam group and perform beam merging to generate a combined output signal. For example, the device 110 may track a minimum noise floor for each beam over time, determine a highest minimum noise floor across the beams, and determine a noise floor ratio between the beam-specific minimum noise floor and the highest minimum noise floor. Using a combination of the noise floor ratio and signal-to-noise ratio (SNR) values, the device 110 may perform beam selection by prioritizing low background noise as well as high SNR to select a pre-defined beam group. In addition, the device 110 may use the noise floor ratio to perform beam merging and generate single-channel output audio data using the selected beam group. For example, the device 110 may scale the beams based on a combination of the SNR value and the noise floor ratio, such that the combined output includes a percentage of the selected beams based on a weighted sum corresponding to a magnitude of the beam and the relative noise floor.

Figure 3:
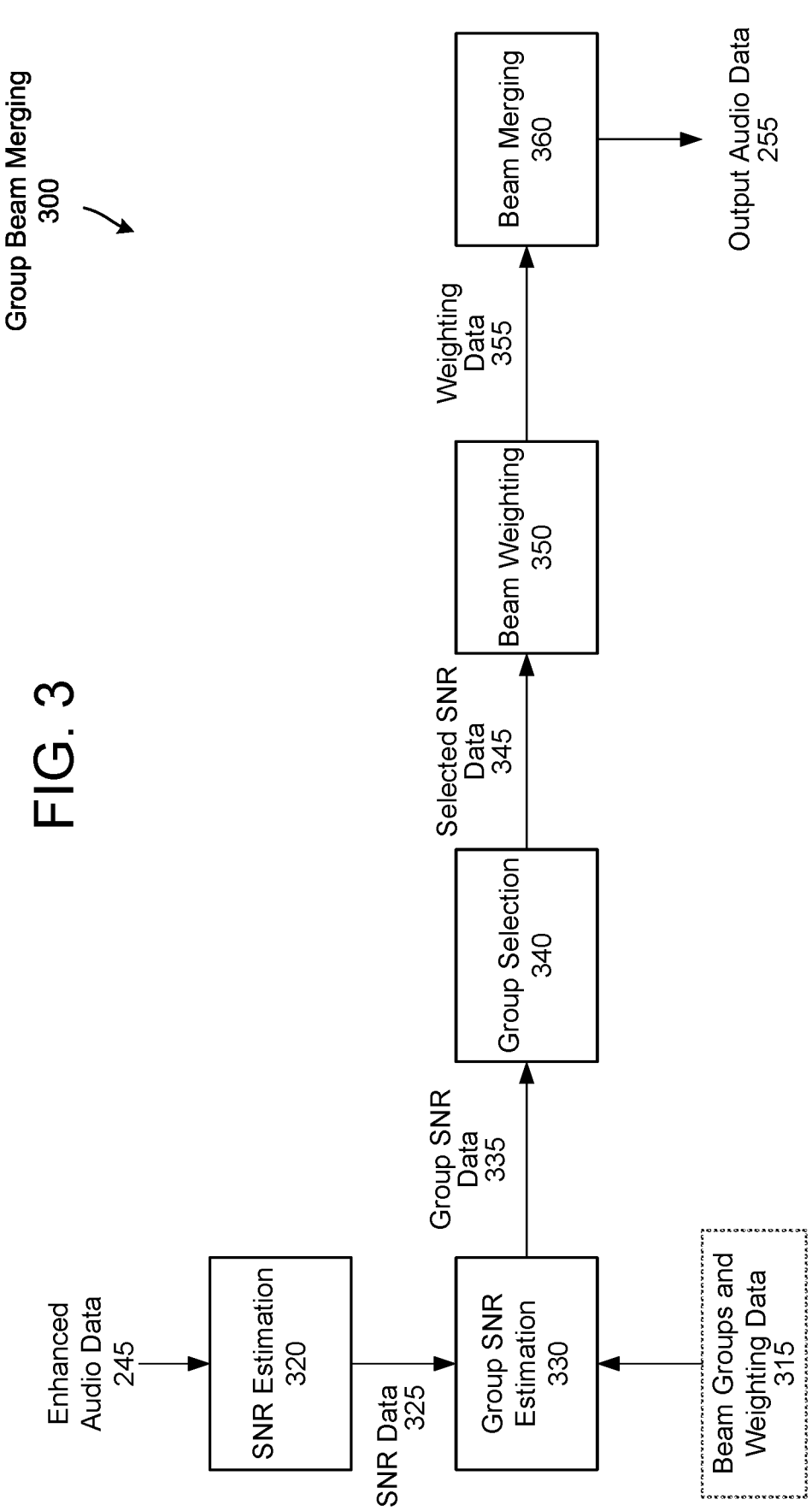
FIG. 3 illustrates a component diagram for performing group beam merging according to embodiments of the present disclosure.

FIG. 3 illustrates a component diagram for performing group beam merging according to embodiments of the present disclosure. As illustrated in FIG. 3, the device 110 may perform group beam merging 300 by performing SNR estimation to determine SNR values for individual beams, group SNR estimation to determine combined SNR values for beam groups, group selection to select a beam group having a highest combined SNR value, beam weighting to determine normalized weights for the selected beam group, and beam merging to generate single-channel output audio data.

As illustrated in FIG. 3, an SNR estimation component 320 may receive enhanced audio data 245 and generate SNR data 325. For example, the SNR estimation component 320 may determine SNR values associated with an individual beam i and frequency band k. The device 110 may determine the SNR value using:

$$SNR = \frac{P_s}{P_n} \quad [1]$$

where the SNR value is calculated for a predefined frequency range (e.g., range of subbands) for a given signal $Y_i(n, k)$ at a given frame index n and tone index k (e.g., frequency index). For example, the signal $Y_i(n, k)$ may correspond to an individual beam from the enhanced audio data 245. Where St(n, k) is the instantaneous power of the given signal:

$$S_i(n,k)=|Y_i(n,k)^2| \quad [2]$$

the device 110 may calculate an average power value across the predefined frequency range (e.g., range of subbands) using:

$$Q_i(n)=\Sigma_{k=startBand}^{stopBand} S_i(n,k) \quad [3]$$

The device 110 may measure the per signal power using a moving average, such as:

$$P_s(n)=\lambda*P_s(n-1)+(1-\lambda)*Q_i(n), \lambda\in[0.75, 0.999] \quad [4]$$

where $P_s(n)$ indicates the signal power for the i-th directional beam and frame index n, $\lambda$ is a smoothing parameter, $P_s(n-1)$ indicates the signal power for the i-th directional beam and a previous frame index n−1, and $Q_i(n)$ indicates the average power value across the predefined frequency range for the i-th directional beam and frame index n.

The device 110 may select a fast smoothing parameter $\lambda_{fast}$ when speech is present in the enhanced audio data 245 and may select a slow smoothing parameter $\lambda_{slow}$ when speech is not present. For example, the fast smoothing parameter $\lambda_{fast}$ may correspond to a first range of values [0.75, 0.85], whereas the slow smoothing parameter $\lambda_{slow}$ may correspond to a second range of values [0.95, 0.999].

$$Q_i(n)>1.02*P_s(n) \quad [5]$$

The device 110 may calculate a minimum noise estimate using noise power $P_n(n)$ that is calculated similar to the signal power $P_s(n)$ using the slow smoothing parameter $\lambda_{slow}$.

$$P_{min}=min(P_n, max(N_{adapt}*P_{min}, P_{min}+minNoise)) \quad [6]$$

where $P_{min}$ indicates a minimum noise power, $P_n$ denotes the noise power calculated using the slow smoothing parameter $\lambda_{slow}$, $N_{adapt}$ denotes a noise adaptation value, and minNoise denotes a minimum noise value. The device 110 may measure the noise power $P_n(n)$ when a wakeword (WW) is not detected and background noise power measurement may be frozen when speech is detected (e.g., the wakeword and/or an utterance).

The device 110 may calculate a background noise power measurement by estimating the minimum noise power during a first time window (e.g., length of $T_{sec}$). In some examples, the device 110 may store minimum noise power values $P_{min}$ in a buffer having a buffer duration equal to the first time window (e.g., $T_{sec}$) and may determine a current minimum noise power using the buffer. For example, the device 110 may calculate a slow moving average power for each frame and store these slow moving average power values in a circular buffer (e.g., NoiseBuffer), such that:

$$P_{currentmin}=min(NoiseBuffer) \quad [7]$$

where $P_{currentmin}$ indicates the current minimum noise power value associated with a current frame.

The value of the current minimum noise power value (e.g., $P_{currentmin}$) may correspond to a minimum noise power measured during the first time window (e.g., $T_{sec}$). In some examples, the device 110 may use the current minimum noise power value as a noise power to calculate the SNR values (e.g., instead of using the noise power $P_n$ described above):

$$SNR = \frac{P_s}{P_{currentmin}} \qquad [8]$$

Additionally or alternatively, the device 110 may introduce a new variable referred to as average minimum noise power value (e.g., $P_{noise_i}(n)$), which the device 110 may use to perform beam selection and/or beam merging.

$$P_{noise_i}(n) = \rho * P_{noise_i}(n-1) + (1-\rho) * P_{currentmin}, \qquad [9]$$

where $P_{noise_i}(n)$ indicates an average minimum noise power value for frame index n, $P_{noise_i}(n-1)$ indicates an average minimum noise power value for a previous frame index n−1, $P_{currentmin}$ indicates a current minimum noise power value, and ρ is a smoothing parameter such that ρ∈[0.75, 0.85].

To determine a relative noise floor associated with each directional beam, the device 110 may determine the average minimum noise power value ($P_{noise_i}$) for each directional beam and then determine a maximum value from the plurality of average minimum noise power values:

$$P_{maxN} = \max_i (P_{noise_i}) \qquad [10]$$

where $P_{max_N}$ indicates a highest value of the average minimum noise power values (e.g., $P_{noise_i}$) from the plurality of directional beams.

To indicate the relative noise floor associated with each directional beam, the device 110 may determine a noise floor ratio ($\beta_i$) for each directional beam 30. For example, the device 110 may determine a noise floor ratio value ($\beta_i$) for an i-th directional beam by calculating a ratio of the maximum value ($P_{max_N}$) to the minimum noise floor value ($P_{noise_i}$) for the i-th directional beam, such that:

$$\beta_i = \frac{P_{maxN}}{P_{noise_i}} \qquad [11]$$

where i is a natural number corresponding to the number of directional beams (e.g., i=0, 1, . . . N).

In some examples, the device 110 may multiply the SNR value ($SNR_i$) and the noise floor ratio value ($\beta_i$) to account for both a magnitude of the signal and a noise floor, enabling the device 110 to perform beam selection based on a combination of a high signal magnitude and a lower background noise. For example, the device 110 may determine a weighted sum value $\beta_{sum}$ of the SNR values ($SNR_i$) for a beam group using:

$$\beta_{sum} = SNR_1\beta_1 + SNR_2\beta_2 + SNR_3\beta_3 \qquad [12]$$

where $\beta_{sum}$ indicates the weighted sum value for a particular beam group, $SNR_i$ indicates an SNR value for the i-th directional beam, and $\beta_i$ indicates a noise floor ratio value for the i-th directional beam. As will be described in greater detail below with regard to FIG. 6, a product of the SNR value ($SNR_i$) and the noise floor ratio value ($\beta_i$) may be referred to as a scaled weight and/or a product value (e.g., $\gamma_i = SNR_i\beta_i$) without departing from the disclosure. Thus, a sum of the product values associated with a beam group corresponds to the weighted sum value $\beta_{sum}$ for the beam group.

As described above, the SNR estimation component 320 may receive the enhanced audio data 245 and generate the SNR data 325. For example, the SNR estimation component 320 may determine SNR values associated with an individual beam i and frequency band k. The SNR estimation component 320 may send the SNR data 325 to a group SNR estimation component 330 to generate group SNR data 335. In addition to the SNR data 325, the group SNR estimation component 330 may receive beam groups and weighting data 315. The beam groups and weighting data 315 may include a beam grouping, which indicates directional beams associated with each beam group, along with weighting corresponding to the beam groups, as will be described in greater detail below with regard to FIG. 5.

Using the SNR data 325 and the beam groups and weighting data 315, the group SNR estimation component 330 may generate the group SNR data 335 for the beam groups. For example, the device 110 may determine a weighted sum value $\beta_{sum}$ of the SNR values ($SNR_i$) for each beam group based on the weighting data and the noise floor ratio values ($\beta_i$).

As illustrated in FIG. 3, a group selection component 340 may receive the group SNR data 335 and perform beam selection to identify a beam group having a highest weighted sum value $\beta_{sum}$ of the beam groups. For example, the weighted sum value $\beta_{sum}$ may account for both a magnitude of the signals and noise floors for each beam group, enabling the device 110 to perform beam selection based on a combination of a high signal magnitude and a lower background noise. The group selection component 340 may output selected SNR data 345 corresponding to the selected beam group to a beam weighting component 350.

As will be described in greater detail below with regard to FIG. 5, the beam weighting component 350 may use the selected SNR data 345 to generate weighting data 355 that enables the device 110 to perform beam merging. For example, the beam weighting component 350 may generate normalized weights by dividing the scaled weight/product value (e.g., $\gamma_i = SNR_i\beta_i$) by the weighted sum value $\beta_{sum}$.

As will be described in greater detail below with regard to FIG. 6, a beam merging component 360 may receive the weighting data 355 and generate the single-channel output audio data 255. For example, the beam merging component 360 may apply the normalized weights to corresponding directional beams to generate the output audio data 255.

Figure 4A:
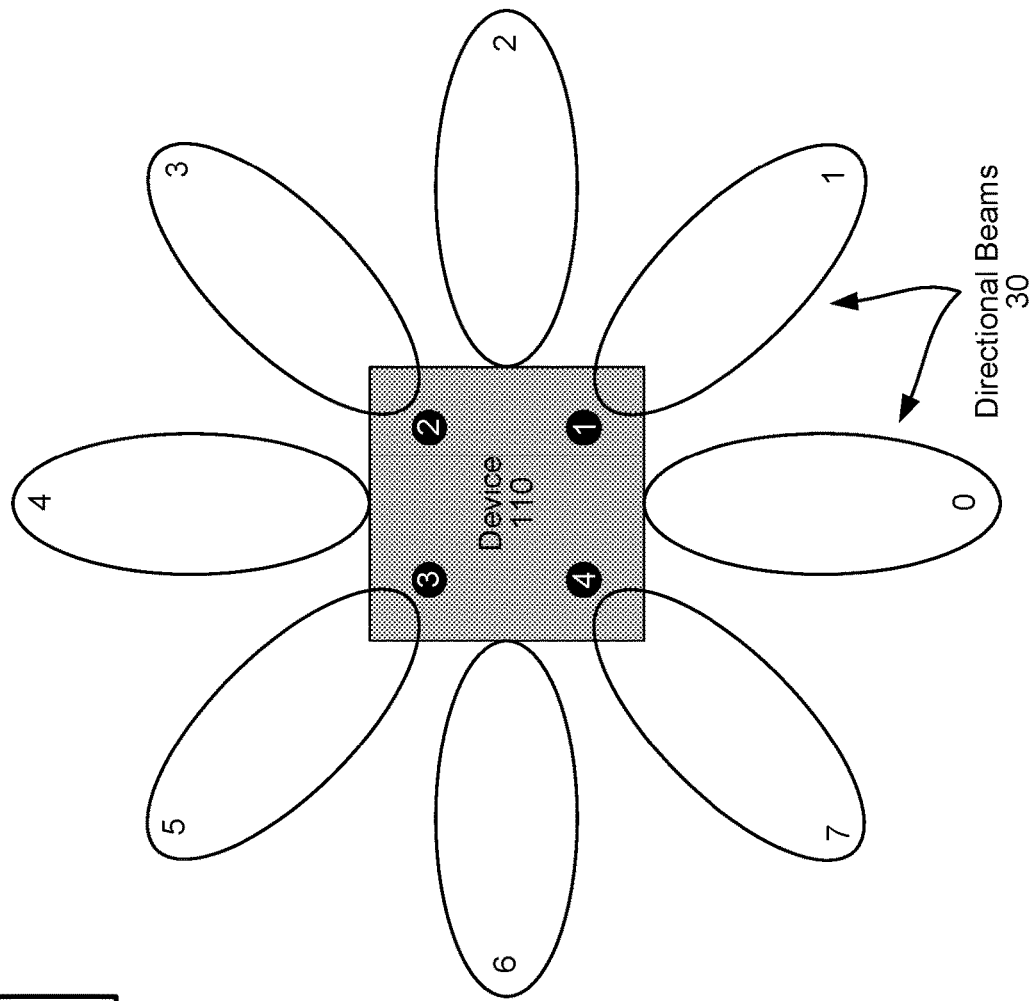

FIGS. 4A-4B illustrate examples of a beam distribution and potential beam groupings according to embodiments of the present disclosure. As illustrated in FIG. 4A, the device 110 may include a first number (e.g., M) of microphones 112 and may perform beamforming to generate a second number (e.g., N) of directional beams 30. For example, FIG. 4A illustrates an example beam distribution 400 in which the device 110 includes four microphones 112a-112d and generates eight directional beams 30a-30h.

As illustrated in FIG. 4A, the directional beams 30 are uniformly distributed around the device 110, such that the directional beams 30 cover 360θ with a separation of 45°. For example, a first directional beam 30a (e.g., "0") extends from a front of the device 110 along a vertical axis, a third directional beam 30c (e.g., "2") extends from a first side of the device 110 along a horizontal axis, a fifth directional beam 30e (e.g., "4") extends from aback of the device 110 along the vertical axis, and a seventh directional beam 30g (e.g., "6") extends from a second side of the device 110 along the horizontal axis. Similarly, a second directional beam 30b (e.g., "1") extends from a first corner of the device 110 in a diagonal direction, a fourth directional beam 30d (e.g., "3") extends from a second corner of the device 110 in a diagonal direction, a sixth directional beam 30f (e.g., "5") extends from a third corner of the device 110 in a diagonal direction, and an eighth directional beam 30h (e.g., "7") extends from a fourth corner of the device 110 in a diagonal direction.

While the example beam distribution 400 illustrates an example configuration of the directional beams 30, the disclosure is not limited thereto and the directional beams 30 may be configured differently without departing from the disclosure. For example, the directional beams 30 may be rotated relative to the device 110, such that two directional beams may correspond to each side of the device 110 without departing from the disclosure. Additionally or alternatively, while the example beam distribution 400 illustrates an example configuration in which the device 110 generates eight directional beams, the disclosure is not limited thereto and the device 110 may generate any number of directional beams without departing from the disclosure.

Regardless of the number of directional beams, the directional beams 30 may be associated with a plurality of predefined beam groups, from which the device 110 may select a single beam group to generate the output audio data 255. For example, FIG. 4B illustrates an example beam group 420 consisting of three beams {7,0,1}. Thus, out of the eight potential beams, the device 110 may perform beam merging to generate the output audio data 255 using the eighth directional beam 30h (e.g., "7"), the first directional beam 30a (e.g., "0"), and the second directional beam 30b (e.g., "1").

While the example beam group 420 corresponds to a first beam group {7,0,1} of the plurality of predefined beam groups, the predefined beam groups may include every combination of three adjacent beams. For example, beam grouping 430 illustrates examples of eight beam groups, which include the first beam group {7,0,1}, a second beam group {0,1,2}, a third beam group {1,2,3}, a fourth beam group {2,3,4}, a fifth beam group {3,4,5}, a sixth beam group {4,5,6}, a seventh beam group {5,6,7}, and an eighth beam group {6,7,0}.

While the beam grouping 430 corresponds to beam groups consisting of three adjacent directional beams, the disclosure is not limited thereto and in other examples the device 110 may generate beam groups consisting of two adjacent directional beams. For example, beam grouping 440 illustrates examples of eight beam groups consisting of two adjacent beams, such that the beam grouping 440 includes every combination of two adjacent beams. As illustrated in FIG. 4B, beam grouping 440 includes a first beam group {0,1}, a second beam group {1,2}, a third beam group {2,3}, a fourth beam group {3,4}, a fifth beam group {4,5}, a sixth beam group {5,6}, a seventh beam group {6,7}, and an eighth beam group {7,0}.

Alternatively, while the beam grouping 430 corresponds to continuous beam groups (e.g., consisting of three adjacent directional beams), the disclosure is not limited thereto. In some examples, the device 110 may generate beam groups that are not continuous (e.g., consisting of non-adjacent directional beams) without departing from the disclosure. For example, the beam grouping 430 could be modified to remove a center beam in each beam group, such that a first beam group includes the eighth directional beam 30h (e.g., "7") and the second directional beam 30b (e.g., "1"), but not the first directional beam 30a (e.g., "0"). Thus, an example of non-adjacent beam groups may include the first beam group {7,1}, a second beam group {0,2}, a third beam group {1,3}, a fourth beam group {2,4}, a fifth beam group {3,5}, a sixth beam group {4,6}, a seventh beam group {5,7}, and an eighth beam group {6,0}. However, the disclosure is not limited thereto, and a first number of directional beams included in each directional group, a second number of directional beams ignored within each directional group, and/or the like may vary without departing from the disclosure. Additionally or alternatively, instead of removing the center beam, the device 110 may associate the center beam with a reduced weight relative to the side beams without departing from the disclosure. For example, the first beam group {7,0,1} may associate the eighth directional beam 30h (e.g., "7") and the second directional beam 30b (e.g., "1") with a first weight (e.g., $w_1=0.4$), while associating the first directional beam 30a (e.g., "0") with a second weight (e.g., $w_2=0.2$), although the disclosure is not limited thereto. In some examples, the non-continuous beam groups can be implemented by setting the second weight to a value of zero without departing from the disclosure.

In some examples, the device 110 may increase a relative weight or priority within a beam group by including multiple entries for a single directional beam. For example, the device 110 may use beam groups that include three entries but only correspond to two adjacent beams, such that one directional beam is prioritized over the other by being listed twice. In this example, the device 110 may associate a first weight (e.g., $w_1=0.667$) with the one directional beam listed twice and a second weight (e.g., $w_2=0.333$) with the other directional beam only listed once. However, the disclosure is not limited thereto and the first weight and/or second weight may vary without departing from the disclosure. Thus, provided that the first weight is greater than the second weight, the first weight may vary within a first range (e.g., $0.5 < w_1 < 1.0$), while the second weight may complement the first weight and vary within a second range (e.g., $0.0 < w_2 < 0.5$). For example, the device 110 may associate the one directional beam with a first weight (e.g., $w_1=0.6$) and associate the other directional beam with a second weight (e.g., $w_2=0.4$), such that the beam group prioritizes the one directional beam without strictly adhering to the proportion of entries included in the beam group.

To conceptually illustrate an example, FIG. 4B illustrates a beam grouping 450 that combines the first directional beam 30a (e.g., "0") and the second directional beam 30b (e.g., "1") using both a first beam group {0,0,1}(e.g., emphasizing the first directional beam 30a) and a second beam group {0,1,1}(e.g., emphasizing the second directional beam 30b). As illustrated in FIG. 4B, the beam grouping 450 includes a total of sixteen beam groups, which are listed as: ({0,0,1}, {0,1,1}, {1,1,2}, {1,2,2}, {2,2,3}, {2,3,3}, {3,3,4}, {3,4,4}, {4,4,5}, {4,5,5}, {5,5,6}, {5,6,6}, {6,6,7}, {6,7,7}, {7,7,0}, {7,0,0}).

While FIG. 4B illustrates examples of three different beam groupings that correspond to two entries or three entries, the disclosure is not limited thereto. Thus, a first number of beam groups, a second number of entries for an individual beam group, a third number of unique directional beams associated with an individual beam group, a uniformity of the beam groups, a weighting associated with each directional beam, and/or the like may vary without departing from the disclosure. For example, while the example beam distribution 400 only includes eight directional beams, the device 110 may generate a large number of directional beams (e.g., 16, 32, etc.) and the second number of entries for an individual beam group may increase a corresponding amount (e.g., 6, 9, etc.) or may vary (e.g., 5, 9, etc.) without departing from the disclosure. In some examples, the device 110 may employ a beam grouping that associates spatially close beams to an individual beam group, such that each beam group is distinct from one another yet has some overlap. This overlap enables the device 110 to maintain the temporal continuity between frames and the continuity between frequencies while beam merging. However, as described above, a relative weighting associated with directional beams within an individual beam group may vary, and in some cases may be equal to zero, without departing from the disclosure.

In some examples, the beam groups may uniformly surround the device 110 (e.g., covering 3600 around the device 110), as illustrated in FIGS. 4A-4B. During operation, however, a distribution of speech directions may not be uniform, such that certain directions may be more likely to correspond to the user than others. For example, if the device 110 is positioned in proximity to a wall, a user may typically interact with the device 110 from a front of the device 110. Thus, user speech may be associated with a first range of directions, while a second range of directions may correspond to acoustic reflections reflected off of the wall. As the second range of directions are more likely to correspond to acoustic reflections, far-field performance and/or accuracy of the device 110 may be improved by decreasing a likelihood of picking beam groups that correspond to the second range of directions.

In some examples, the device 110 may include some form of bias that results in a preference for certain beam groups over others. In the example described above, for example, the device 110 may associate the first range of directions with a first weight (e.g., first pre-defined gain) and the second range of directions with a second weight (e.g., second pre-defined gain). Based on these relative weights, the device 110 is more likely to select first beam groups associated with the first range of directions (e.g., facing a front of the device 110) than second beam groups associated with the second range of directions (e.g., facing a back of the device 110) in response to similar signals.

In some examples, the device 110 may implement this bias by associating again parameter (e.g., weight value) with an individual beam group. For example, the device 110 may increase a preference for a first beam group by selecting a first gain parameter that is within a first range (e.g., $1.0 < G_1 < 3.0$), may indicate a neutral preference for a second beam group by selecting a second gain parameter that is equal to a first value (e.g., $G_2=1.0$), and/or may decrease a preference for a third beam group by selecting a third gain parameter within a second range (e.g., $0.0 < G_3 < 1.0$). In some examples, the device 110 may only increase a preference for certain beam groups over others without decreasing a preference of any of the beam groups. For example, the device 110 may associate preferred beam groups with a first gain parameter (e.g., 1.4, 1.6, and/or the like) and may associate remaining beam groups with the second gain parameter (e.g., 1.0), although the disclosure is not limited thereto.

The gain parameters may be determined based on a variety of factors, which may include device-specific parameters (e.g., based on device geometry, such as direction(s) associated with loudspeakers 114 of the device 110), expected use-case(s) (e.g., where the device is expected to be placed relative to a wall, expected position of the user relative to the device 110, etc.), aggregate historical data (e.g., frequently selected beam groups for similar devices), individual historical data (e.g., beam groups frequently selected by the device 110), and/or the like. In some examples, the gain parameters may be fixed for the device 110 and all similar devices, such that the gain parameters prioritize certain beam groups over others based on the device-specific parameters, the expected use-case(s), and/or the like. For example, the gain parameters may prefer beam groups that point towards a front of the device 110 and/or that do not point towards the loudspeaker(s) 114, although the disclosure is not limited thereto. Additionally or alternatively, the gain parameters may vary over time and/or between individual devices, such that the gain parameters prioritize certain beam groups over others based on the aggregate historical data, the individual historical data, and/or the like. For example, the gain parameters may prefer beam groups that are frequently selected by the device 110 and/or by similar devices based on historical usage data, although the disclosure is not limited thereto.

Figure 5:
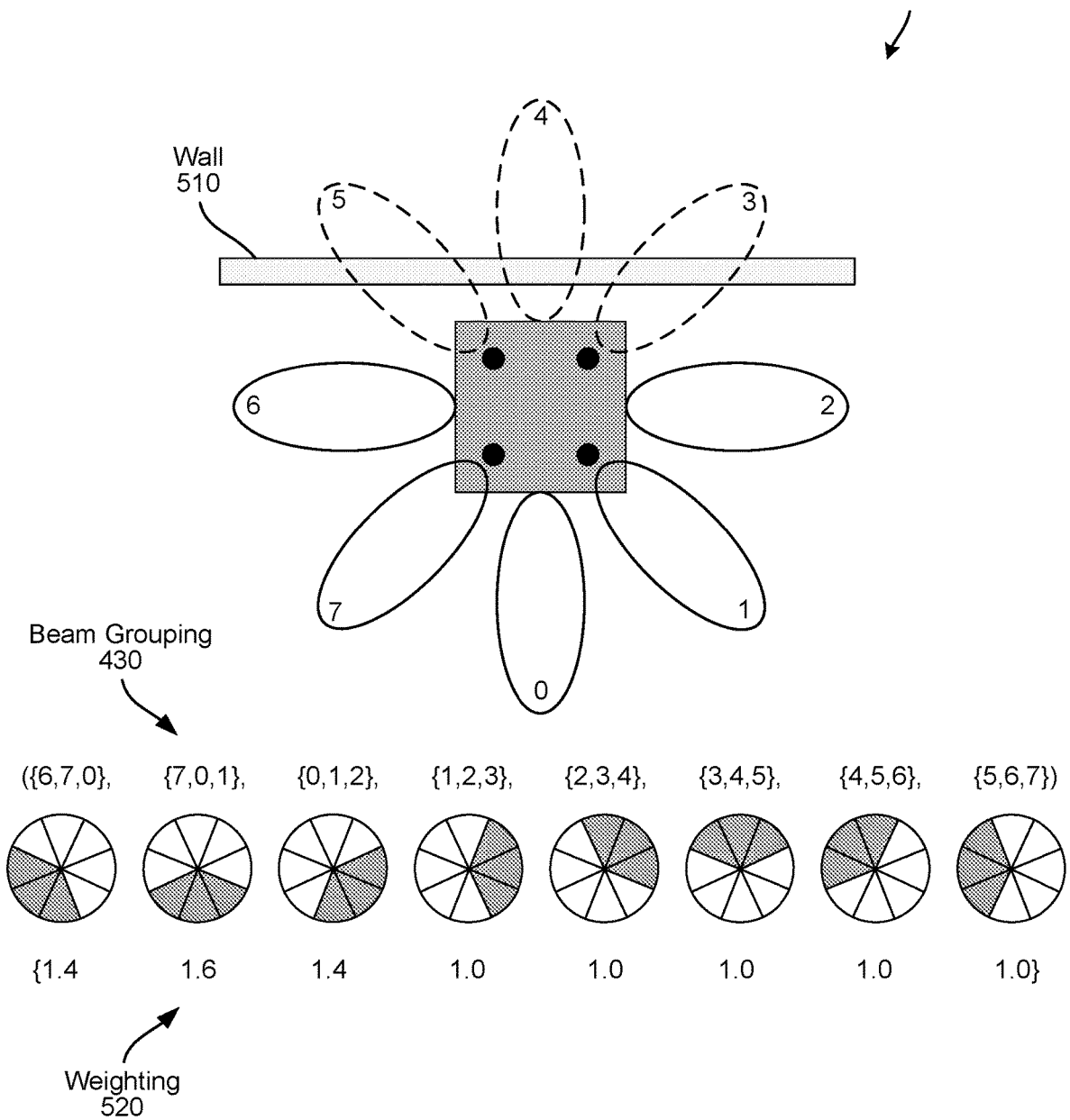
FIG. 5 illustrates an example of beam weighting according to embodiments of the present disclosure.

FIG. 5 illustrates an example of beam weighting according to embodiments of the present disclosure. As described above, in some examples the device 110 may be positioned in proximity to a wall, such as when the device 110 is placed directly below a wall-mounted television. To illustrate how the device 110 may implement the gain parameters described above, example beam weighting 500 illustrates an example in which the device 110 is positioned next to a wall 510. As illustrated in FIG. 5, the fifth directional beam 30e (e.g., "4"), which corresponds to a back of the device 110, is directly perpendicular to the wall 510.

Due to the relative position of the wall 510, the fourth directional beam 30d (e.g., "3"), the fifth directional beam 30e (e.g., "4"), and the sixth directional beam 30f (e.g., "5") may correspond to acoustic reflections reflected by the wall 510. Additionally or alternatively, based on the position of the device 110 and/or an expected use-case of the device 110, the eighth directional beam 30h (e.g., "7"), the first directional beam 30a (e.g., "0"), and the second directional beam 30b (e.g., "1") may correspond to direct sound (e.g., a direct path between the user and the device 110) associated with user speech.

As illustrated in FIG. 5, the example beam weighting 500 illustrates an example of beam group weighting (e.g., gain parameters) associated with the beam grouping 430 described above with regard to FIG. 4B. For example, the beam grouping 430 is illustrated as having three directional beams in each beam group, resulting in eight unique beam groups, which are shown as ({6,7,0}, {7,0,1}, {0,1,2}, {1,2,3}, {2,3,4}, {3,4,5}, {4,5,6}, {5,6,7}). Using the beam grouping 430, the example beam weighting 500 illustrates an example of weighting 520 that associates each beam group with a corresponding gain parameter within a first range (e.g., between 0 dB and 3 dB), although the disclosure is not limited thereto.

As illustrated in FIG. 5, the weighting 520 illustrates eight weight values corresponding to the eight beam groups: {1.4, 1.6, 1.4, 1.0, 1.0, 1.0, 1.0, 1.0}, which are listed in order based on the eight unique beam groups described above. For example, the weighting 520 associates a first gain value (e.g., 1.4 dB) with the first beam group {6,7,0}, a second gain value (e.g., 1.6 dB) with the second beam group {7,0,1}, a third gain value (e.g., 1.4 dB) with the third beam group {0,1,2}, a fourth gain value (e.g., 1.0 dB) with the fourth beam group {1,2,3}, a fifth gain value (e.g., 1.0 dB) with the fifth beam group {2,3,4}, a sixth gain value (e.g., 1.0 dB) with the sixth beam group {3,4,5}, a seventh gain value (e.g., 1.0 dB) with the seventh beam group {4,5,6}, and an eighth gain value (e.g., 1.4 dB) with the eighth beam group {5,6,7}. While the example beam weighting 500 illustrates the multiple beam groups sharing the same gain value (e.g., 1.0 dB), the disclosure is not limited thereto and the gain values may vary without departing from the disclosure.

Based on the weighting 520 illustrated in FIG. 5, the device 110 may prioritize or otherwise exhibit preference for the first beam group {6,7,0}, the second beam group {7,0,1}, and the third beam group {0,1,2}, which corresponds to directional beams associated with a front of the device 110 (e.g., 6-7 and 0-2). After selecting an individual beam group, the device 110 may perform beam merging as described in greater detail above with regard to FIG. 3.

Figure 6:
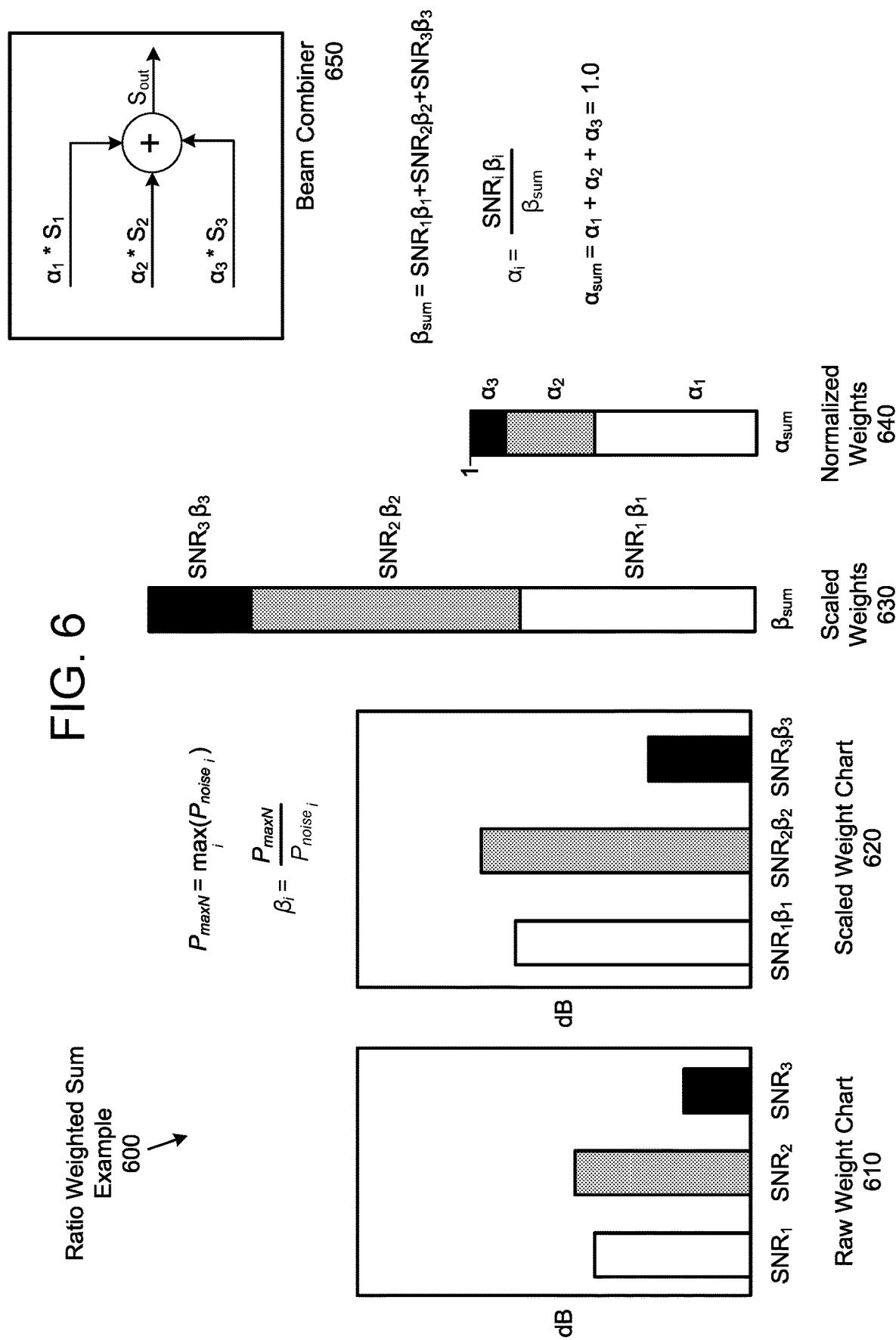
FIG. 6 illustrates an example of using a ratio weighted sum to determine normalized weights according to embodiments of the present disclosure.

FIG. 6 illustrates an example of using a ratio weighted sum to determine normalized weights according to embodiments of the present disclosure. As described above, the device 110 may determine a weighted sum value for each of the plurality of beam groups, with an individual weighted sum value for a beam group corresponding to a signal magnitude and background noise associated with the directional beams 30 included in the beam group. In some examples, the device 110 may determine the weighted sum values using two signal quality metrics, such as noise floor ratio values and signal-to-noise ratio (SNR) values, although the disclosure is not limited thereto.

To illustrate an example, the device 110 may determine a weighted sum value $\beta_{sum}$ for the fourth beam group {1, 2, 3} by:
(i) multiplying a first SNR value ($SNR_1$) and a first noise floor ratio ($\beta_1$) associated with the second directional beam 30b (e.g., "1") to determine a first product value ($\gamma_1$) (e.g., $\gamma_1 = SNR_1 \beta_1$),
(ii) multiplying a second SNR value ($SNR_2$) and a second noise floor ratio ($\beta_2$) associated with the third directional beam 30c (e.g., "2") to determine a second product value ($\gamma_2$) (e.g., $\gamma_2 = SNR_2 \beta_2$),
(iii) multiplying a third SNR value ($SNR_3$) and a third noise floor ratio ($\beta_3$) associated with the fourth directional beam 30d (e.g., "3") to determine a third product value ($\gamma_3$) (e.g., $\gamma_3 = SNR_3 \beta_3$), and
(iv) determining the first weighted sum value ($\beta_{sum}$) by summing the first product ($\gamma_1$), the second product ($\gamma_2$), and the third product ($\gamma_3$) (e.g., $\beta_{sum} = \gamma_1 + \gamma_2 + \gamma_3$).

After determining a weighted sum value for each of the plurality of beam groups, the device 110 may select the beam group having a highest weighted sum value in order to perform beam merging. For example, if the device 110 determined that the weighted sum value $\beta_{sum}$ for the fourth beam group {1, 2, 3} was a highest weighted sum value of the plurality of beam groups, the device 110 may select the fourth beam group and perform beam merging using the second directional beam 30b (e.g., "1"), the third directional beam 30c (e.g., "2"), and the fourth directional beam 30d (e.g., "3").

FIG. 6 illustrates an example of performing beam merging using a selected beam group. For example, ratio weighted sum example 600 illustrates how the device 110 may determine normalized weights with which to generate a combined output associated with the fourth beam group {1, 2, 3}. As illustrated in FIG. 6, examples of the SNR values ($SNR_i$) for each directional beam are illustrated in raw weight chart 610. For example, the raw weight chart 610 includes the first SNR value ($SNR_1$), the second SNR value ($SNR_2$), and the third SNR value ($SNR_3$). Similarly, scaled weight chart 620 illustrates examples of the product values ($\gamma_i$) determined using the SNR values ($SNR_i$) and the noise floor ratios ($\beta_i$) for each directional beam (e.g., $\gamma_i = SNR_i \beta_i$). For example, the scaled weight chart 620 includes the first product value (e.g., $\gamma_1 = SNR_1 \beta_1$), the second product value (e.g., $\gamma_2 = SNR_2 \beta_2$), and the third product value (e.g., $\gamma_3 = SNR_3 \beta_3$).

As described in greater detail above and illustrated in FIG. 6, the device 110 may determine the noise floor ratios ($\beta_i$) for each directional beam by determining a minimum noise floor value ($P_{noise_i}$) for each directional beam and then determining a maximum value of the minimum noise floor values (e.g., $P_{max_N} = \max(P_{noise_i})$). For example, the noise floor ratio value ($\beta_i$) for an i-th directional beam corresponds to a ratio of the maximum value ($P_{max_N}$) and the minimum noise floor value ($P_{noise_i}$) for the i-th directional beam (e.g., $\beta_i = P_{max_N}/P_{noise_i}$) where i is a natural number corresponding to the number of directional beams (e.g., i=0, 1, . . . N).

As illustrated in FIG. 6, the product values ($\gamma_i$) are illustrated as scaled weights 630, such that a sum of the scaled weights 630 corresponds to the weighted sum value $\beta_{sum}$:

$$\beta_{sum} = \gamma_1 + \gamma_2 + \gamma_3 = SNR_1\beta_1 + SNR_2\beta_2 + SNR_3\beta_3$$

To determine normalized weights 640 with which to perform beam merging, the device 110 may normalize the scaled weights 630 using the weighted sum value $\beta_{sum}$. For example, the device 110 may divide a scaled weight value (e.g., $\gamma_i = SNR_i \beta_i$) by the weighted sum value $\beta_{sum}$ to determine a normalized weight value $$\left(\alpha_i = \frac{SNR_i \beta_i}{\beta_{sum}}\right),$$

such that a sum of the normalized weights 640 corresponds to a value of one (e.g., $\alpha_{sum} = \alpha_1 + \alpha_2 + \alpha_3 = 1.0$).

Finally, the device 110 may perform beam merging by combining the directional beams using the normalized weights 640. For example, the device 110 may determine a combined audio output $S_{out}$:

$$S_{out} = \alpha_1 * S_1 + \alpha_2 * S_2 + \ldots + \alpha_m * S_m \quad [13]$$

As illustrated in FIG. 6, beam combiner 650 illustrates an example of the device 110 performing beam merging using the normalized weights ($\alpha_i$) to combine the directional beams. For example, the beam combiner 650 illustrates three directional beams (e.g., 30b, 30c, and 30d, which are represented as $S_1$, $S_2$, and $S_3$) being combined into a single audio output ($S_{out}$). As illustrated in FIG. 6, the device 110 may determine a first scaled weight (e.g., $\gamma_1 = SNR_1 \beta_1$) corresponding to the second directional beam 30b (e.g., $S_1$), determine a first normalized weight ($\alpha_1$) from the first scaled weight (e.g., $\alpha_1 = SNR_1\beta_1/\beta_{sum}$), and multiply the second directional beam 30b (e.g., $S_1$) by the first normalized weight ($\alpha_1$) to generate a first portion of the audio output (e.g., $S_{out-1} = \alpha_1 * S_1$). Similarly, the device 110 may determine a second scaled weight (e.g., $\gamma_2 = SNR_2 \beta_2$) corresponding to the third directional beam 30c (e.g., $S_2$), determine a second normalized weight ($\alpha_2$) from the second scaled weight (e.g., $\alpha_2 = SNR_2\beta_2/\beta_{sum}$), and multiply the third directional beam 30c (e.g., $S_2$) by the second normalized weight ($\alpha_2$) to generate a second portion of the audio output (e.g., $S_{out2} = \alpha_2 * S_2$). Finally, the device 110 may determine a third scaled weight (e.g., $\gamma_3 = SNR_3\beta_3$) corresponding to the fourth directional beam 30d (e.g., $S_3$), determine a third normalized weight ($\alpha_3$) from the third scaled weight (e.g., $\alpha_3 = SNR_3\beta_3/\beta_{sum}$), and multiply the fourth directional beam 30d (e.g., $S_4$) by the third normalized weight ($\alpha_3$) to generate a third portion of the audio output (e.g., $S_{out3}=\alpha_3*S_3$). The device 110 may determine the combined output by summing the first portion, the second portion, and the third portion (e.g., $S_{out}=S_1+S_2+S_3$).

Figure 7:
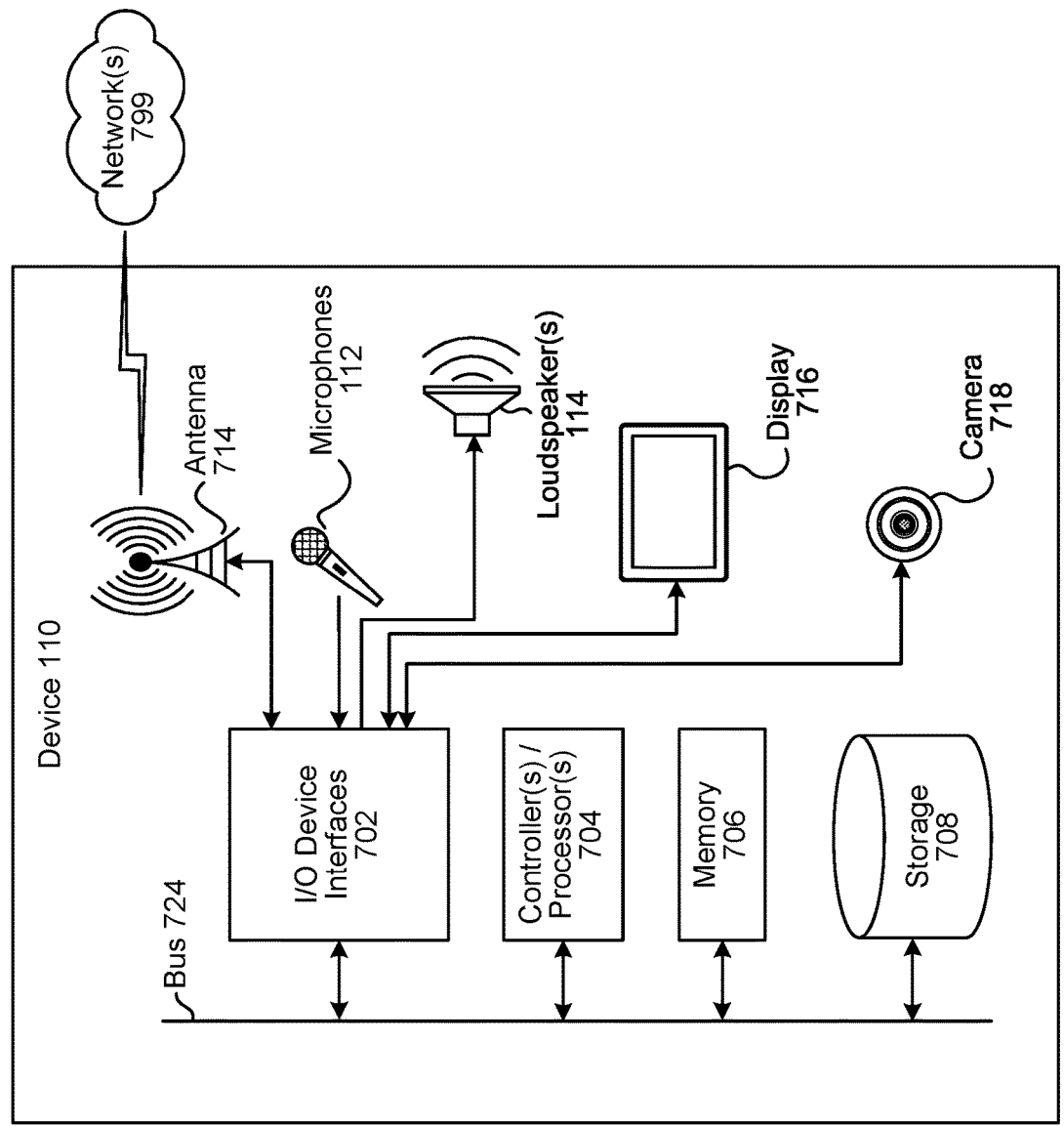
FIG. 7 is a block diagram conceptually illustrating example components of a system for determining a distance and/or direction of an acoustically reflective surface according to embodiments of the present disclosure.

FIG. 7 is a block diagram conceptually illustrating a device 110 that may be used with the system. In operation, the system 100 may include computer-readable and computer-executable instructions that reside on the device 110, as will be discussed further below.

The device 110 may include one or more audio capture device(s), such as microphones 112 or an array of microphones. The audio capture device(s) may be integrated into the device 110 or may be separate. The device 110 may also include an audio output device for producing sound, such as loudspeaker(s) 712. The audio output device may be integrated into the device 110 or may be separate. In some examples the device 110 may include a display 716, but the disclosure is not limited thereto and the device 110 may not include a display or may be connected to an external device/display without departing from the disclosure.

The device 110 may include one or more controllers/processors (704), which may each include a central processing unit (CPU) for processing data and computer-readable instructions, and a memory (706) for storing data and instructions of the respective device. The memory (706) may individually include volatile random access memory (RAM), non-volatile read only memory (ROM), non-volatile magnetoresistive memory (MRAM), and/or other types of memory. The device 110 may also include a data storage component (708) for storing data and controller/processor-executable instructions. Each data storage component (708) may individually include one or more non-volatile storage types such as magnetic storage, optical storage, solid-state storage, etc. The device 110 may also be connected to removable or external non-volatile memory and/or storage (such as a removable memory card, memory key drive, networked storage, etc.) through respective input/output device interfaces (702).

Computer instructions for operating the device 110 and its various components may be executed by the respective device's controller(s)/processor(s) (704), using the memory (706) as temporary "working" storage at runtime. A device's computer instructions may be stored in a non-transitory manner in non-volatile memory (706), data storage component (708), or an external device(s). Alternatively, some or all of the executable instructions may be embedded in hardware or firmware on the respective device in addition to or instead of software.

The device 110 includes input/output device interfaces (702). A variety of components may be connected through the input/output device interfaces (702), such as the microphones 112, the loudspeaker(s) 712, and/or the display 716. The input/output interfaces (702) may include A/D converters for converting the output of the microphones 112 into microphone audio data, if the microphones 112 are integrated with or hardwired directly to the device 110. If the microphones 112 are independent, the A/D converters will be included with the microphones 112, and may be clocked independent of the clocking of the device 110. Likewise, the input/output interfaces 702 may include D/A converters for converting output audio data into an analog current to drive the loudspeaker(s) 712, if the loudspeaker(s) 712 are integrated with or hardwired to the device 110. However, if the loudspeaker(s) 712 are independent, the D/A converters will be included with the loudspeaker(s) 712 and may be clocked independent of the clocking of the device 110 (e.g., conventional Bluetooth loudspeakers).

Additionally, the device 110 may include an address/data bus (724) for conveying data among components of the respective device. Each component within a device 110 may also be directly connected to other components in addition to (or instead of) being connected to other components across the bus (724).

Referring to FIG. 7, the device 110 may include input/output device interfaces 702 that connect to a variety of components such as an audio output component such as loudspeaker(s) 712, a wired headset or a wireless headset (not illustrated), or other component capable of outputting audio. The device 110 may also include an audio capture component. The audio capture component may be, for example, microphones 112 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content and/or a camera 718 to capture image data, although the disclosure is not limited thereto. The input/output device interfaces (702) may also include an interface for an external peripheral device connection such as universal serial bus (USB), FireWire, Thunderbolt or other connection protocol.

The device 110 may connect to one or more network(s) 799 through either wired and/or wireless connections. For example, the device 110 may connect to the network(s) 799 via an Ethernet port, through a wireless service provider (e.g., using a WiFi or cellular network connection), over a wireless local area network (WLAN) (e.g., using WiFi or the like), over a wired connection such as a local area network (LAN), and/or the like. The network(s) 799 may include a local or private network or may include a wide network such as the Internet.

As illustrated in FIG. 7, the input/output device interfaces 702 may connect to the network(s) 799 via antenna(s) 714. For example, the device 110 may connect to the network(s) 799 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 799, the system may be distributed across a networked environment. The I/O device interface (702) may also include communication components that allow data to be exchanged between devices such as different physical servers in a collection of servers or other components.

The components of the device 110 may include their own dedicated processors, memory, and/or storage. Alternatively, one or more of the components of the device 110 may utilize the I/O interfaces (702), processor(s) (704), memory (706), and/or data storage component (708) of the device 110, respectively. Thus, an ASR component may have its own I/O interface(s), processor(s), memory, and/or storage; an NLU component may have its own I/O interface(s), processor(s), memory, and/or storage; and so forth for the various components discussed herein. As noted above, multiple devices may be employed in a single system. In such a multi-device system, each of the devices may include different components for performing different aspects of the system's processing. The multiple devices may include overlapping components. The components of the device 110, as described herein, are illustrative, and may be located as a stand-alone device or may be included, in whole or in part, as a component of a larger device or system.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented in different forms of software, firmware, and/or hardware, such as an acoustic front end (AFE), which comprises, among other things, analog and/or digital filters (e.g., filters configured as firmware to a digital signal processor (DSP)). Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
    receiving first audio data including a first portion corresponding to a first direction and a second portion corresponding to a second direction, the first audio data including a first representation of speech;
    determining, using the first portion of the first audio data, a first value representing a first noise floor of the first portion of the first audio data;
    determining, using the second portion of the first audio data, a second value representing a second noise floor of the second portion of the first audio data;
    determining, using the first value, a first signal quality metric value corresponding to the first portion of the first audio data;
    determining, using the first value and the second value, a first ratio value; and
    determining, using the first signal quality metric value and the first ratio value, second audio data corresponding to a first plurality of directions including the first direction, the second audio data including a second representation of the speech.

2. The computer-implemented method of claim 1, wherein determining the second audio data further comprises:
    determining, using a third portion of the first audio data corresponding to a third direction, a third value representing a third noise floor of the third portion;
    determining, using the third value, a second signal quality metric value corresponding to the third portion;
    determining, using the third value and the second value, a second ratio value;
    determining a first portion of the second audio data using the first portion of the first audio data, the first signal quality metric value, the first ratio value, the second signal quality metric value, and the second ratio value; and
    determining a second portion of the second audio data using the third portion of the first audio data, the first signal quality metric value, the first ratio value, the second signal quality metric value, and the second ratio value.

3. The computer-implemented method of claim 1, wherein determining the second audio data further comprises:
    determining a first product of the first ratio value and the first signal quality metric value;
    determining a second product of a second ratio value and a second signal quality metric value, the second ratio value and the second signal quality metric value associated with a third portion of the first audio data corresponding to a third direction;
    determining a first weight value using the first product and a sum of the first product and the second product;
    determining a second weight value using the second product and the sum of the first product and the second product;

determining, using the first weight value and the first portion of the first audio data, a first portion of the second audio data; and determining, using the second weight value and the third portion of the first audio data, a second portion of the second audio data.

4. The computer-implemented method of claim 1, wherein determining the second audio data further comprises:
determining a first group value using the first signal quality metric value and the first ratio value, the first group value corresponding to the first plurality of directions;
determining that the first group value satisfies a condition; and
determining, using the first plurality of directions and the first audio data, the second audio data.

5. The computer-implemented method of claim 1, wherein determining the second audio data further comprises:
determining a first group value using the first signal quality metric value and the first ratio value, the first group value corresponding to the first plurality of directions;
determining a second group value corresponding to a second plurality of directions including the second direction;
determining that the first group value is higher than the second group value; and
determining, using the first plurality of directions and the first audio data, the second audio data.

6. The computer-implemented method of claim 1, further comprising:
determining, using a third portion of the first audio data corresponding to a third direction, a third value representing a third noise floor of the third portion of the first audio data;
determining that the second value is greater than the first value and the third value;
determining, using the second value, a second ratio value corresponding to the second portion of the first audio data; and
determining, using the third value and the second value, a third ratio value corresponding to the third portion of the first audio data.

7. The computer-implemented method of claim 6, wherein determining the second audio data further comprises:
determining a first product of the first ratio value and the first signal quality metric value;
determining a second product of the third ratio value and a second signal quality metric value associated with the third portion of the first audio data;
determining that a sum of the first product and the second product satisfies a condition; and
determining, using the first plurality of directions and the first audio data, the second audio data, wherein the first plurality of directions includes the first direction and the third direction.

8. The computer-implemented method of claim 6, wherein determining the second audio data further comprises:
determining a first product of the first ratio value and the first signal quality metric value;
determining a second product of the third ratio value and a second signal quality metric value associated with the third portion of the first audio data;

determining, using the first product and the first portion of the first audio data, a first portion of the second audio data; and determining, using the second product and the third portion of the first audio data, a second portion of the second audio data.

9. The computer-implemented method of claim 1, wherein determining the second audio data further comprises:
determining a first group value using the first signal quality metric value and the first ratio value;
determining a second group value corresponding to a second plurality of directions that includes the second direction;
determining a third group value using the first group value and a first weight value associated with the first plurality of directions;
determining a fourth group value using the second group value and a second weight value associated with the second plurality of directions;
determining that the third group value is higher than the fourth group value; and
determining, using the first plurality of directions and the first audio data, the second audio data.

10. The computer-implemented method of claim 1, wherein determining the first value further comprises:
determining, using the first portion of the first audio data, first power values;
determining, using the first power values, first noise floor data; and
determining the first value using a lowest value represented in the first noise floor data.

11. A system comprising:
at least one processor; and
memory including instructions operable to be executed by the at least one processor to cause the system to:
receive first audio data including a first portion corresponding to a first direction and a second portion corresponding to a second direction, the first audio data including a first representation of speech;
determine, using the first portion of the first audio data, a first value representing a first noise floor of the first portion of the first audio data;
determine, using the second portion of the first audio data, a second value representing a second noise floor of the second portion of the first audio data;
determine, using the first value, a first signal quality metric value corresponding to the first portion of the first audio data;
determine, using the first value and the second value, a first ratio value; and
determine, using the first signal quality metric value and the first ratio value, second audio data corresponding to a first plurality of directions including the first direction, the second audio data including a second representation of the speech.

12. The system of claim 11, wherein the memory further comprises instructions that, when executed by the at least one processor, further cause the system to:
determine, using a third portion of the first audio data corresponding to a third direction, a third value representing a third noise floor of the third portion;
determine, using the third value, a second signal quality metric value corresponding to the third portion;
determine, using the third value and the second value, a second ratio value;

determine a first portion of the second audio data using the first portion of the first audio data, the first signal quality metric value, the first ratio value, the second signal quality metric value, and the second ratio value; and determine a second portion of the second audio data using the third portion of the first audio data, the first signal quality metric value, the first ratio value, the second signal quality metric value, and the second ratio value.

13. The system of claim 11, wherein the memory further comprises instructions that, when executed by the at least one processor, further cause the system to:

determine a first product of the first ratio value and the first signal quality metric value;

determine a second product of a second ratio value and a second signal quality metric value, the second ratio value and the second signal quality metric value associated with a third portion of the first audio data corresponding to a third direction;

determine a first weight value using the first product and a sum of the first product and the second product;

determine a second weight value using the second product and the sum of the first product and the second product;

determine, using the first weight value and the first portion of the first audio data, a first portion of the second audio data; and determine, using the second weight value and the third portion of the first audio data, a second portion of the second audio data.

14. The system of claim 11, wherein the memory further comprises instructions that, when executed by the at least one processor, further cause the system to:

determine a first group value using the first signal quality metric value and the first ratio value, the first group value corresponding to the first plurality of directions;

determine that the first group value satisfies a condition; and determine, using the first plurality of directions and the first audio data, the second audio data.

15. The system of claim 11, wherein the memory further comprises instructions that, when executed by the at least one processor, further cause the system to:

determine a first group value using the first signal quality metric value and the first ratio value, the first group value corresponding to the first plurality of directions;

determine a second group value corresponding to a second plurality of directions including the second direction;

determine that the first group value is higher than the second group value; and determine, using the first plurality of directions and the first audio data, the second audio data.

16. The system of claim 11, wherein the memory further comprises instructions that, when executed by the at least one processor, further cause the system to:

determine, using a third portion of the first audio data corresponding to a third direction, a third value representing a third noise floor of the third portion of the first audio data;

determine that the second value is greater than the first value and the third value;

determine, using the second value, a second ratio value corresponding to the second portion of the first audio data; and determine, using the third value and the second value, a third ratio value corresponding to the third portion of the first audio data.

17. The system of claim 16, wherein the memory further comprises instructions that, when executed by the at least one processor, further cause the system to:

determine a first product of the first ratio value and the first signal quality metric value;

determine a second product of the third ratio value and a second signal quality metric value associated with the third portion of the first audio data;

determine that a sum of the first product and the second product satisfies a condition; and determine, using the first plurality of directions and the first audio data, the second audio data, wherein the first plurality of directions includes the first direction and the third direction.

18. The system of claim 16, wherein the memory further comprises instructions that, when executed by the at least one processor, further cause the system to:

determine a first product of the first ratio value and the first signal quality metric value;

determine a second product of the third ratio value and a second signal quality metric value associated with the third portion of the first audio data;

determine, using the first product and the first portion of the first audio data, a first portion of the second audio data; and determine, using the second product and the third portion of the first audio data, a second portion of the second audio data.

19. The system of claim 11, wherein the memory further comprises instructions that, when executed by the at least one processor, further cause the system to:

determine a first group value using the first signal quality metric value and the first ratio value;

determine a second group value corresponding to a second plurality of directions that includes the second direction;

determine a third group value using the first group value and a first weight value associated with the first plurality of directions;

determine a fourth group value using the second group value and a second weight value associated with the second plurality of directions;

determine that the third group value is higher than the fourth group value; and determine, using the first plurality of directions and the first audio data, the second audio data.

20. The system of claim 11, wherein the memory further comprises instructions that, when executed by the at least one processor, further cause the system to:

determine, using the first portion of the first audio data, first power values;

determine, using the first power values, first noise floor data; and determine the first value using a lowest value represented in the first noise floor data.

* * * * *